United States Patent [19]
Syamoto et al.

[11] Patent Number: 6,098,483
[45] Date of Patent: Aug. 8, 2000

[54] SHORT STROKE SHIFT LEVER DEVICE

[75] Inventors: Noriyasu Syamoto; Masashi Kato; Masahiko Ookawa, all of Aichi-ken, Japan

[73] Assignee: Kabushiki Kaisha Tokai-Rika-Denki-Seisakusho, Aichi-Ken, Japan

[21] Appl. No.: 09/174,549

[22] Filed: Oct. 19, 1998

[30] Foreign Application Priority Data

Oct. 21, 1997 [JP] Japan ................................. 9-288840

[51] Int. Cl.⁷ ................................................ B60K 20/02
[52] U.S. Cl. ................................ 74/473.18; 74/473.12
[58] Field of Search .......................... 74/473.18, 473.1, 74/471 R, 473.12, 473.21

[56] References Cited

U.S. PATENT DOCUMENTS

| | | | |
|---|---|---|---|
| 3,292,450 | 12/1966 | Hurst et al. | 74/473.18 |
| 4,326,432 | 4/1982 | Miller | 74/475 |
| 5,009,128 | 4/1991 | Seidel et al. | 74/473 R |
| 5,509,322 | 4/1996 | Anderson et al. | 74/335 |
| 5,791,197 | 8/1998 | Rempinski et al. | 74/473.18 |
| 5,884,529 | 3/1999 | Meyer | 74/473.18 |
| 6,000,296 | 12/1999 | Sundquist | 74/473.12 |

*Primary Examiner*—David M. Fenstermacher
*Attorney, Agent, or Firm*—Nixon Peabody LLP; Thomas W. Cole

[57] ABSTRACT

A short stroke shift lever device that is capable of shifting gears within a small space by a ratchet-like mechanism. When a pivotally mounted shift lever is moved from an intermediate portion of a shift groove to a front end or rear end of the shift groove with a pin of a ball shaft coming into a hole of a control plate, the ball shaft rotates via the joint toward the front side or rear side and the control plate rotates around the shaft; subsequently, a protrusion comes into a groove adjacent to the groove into which the protrusion had come until then, and the shift position of an automatic transmission is changed one step. By repeating a pivotal movement of the shift lever, the gear of the automatic transmission may be changed to any position. The device reduces the amount of space required for installation of the shift lever.

21 Claims, 16 Drawing Sheets

FIG. 2
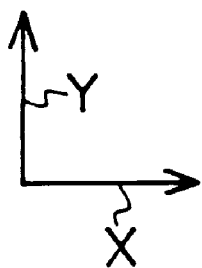
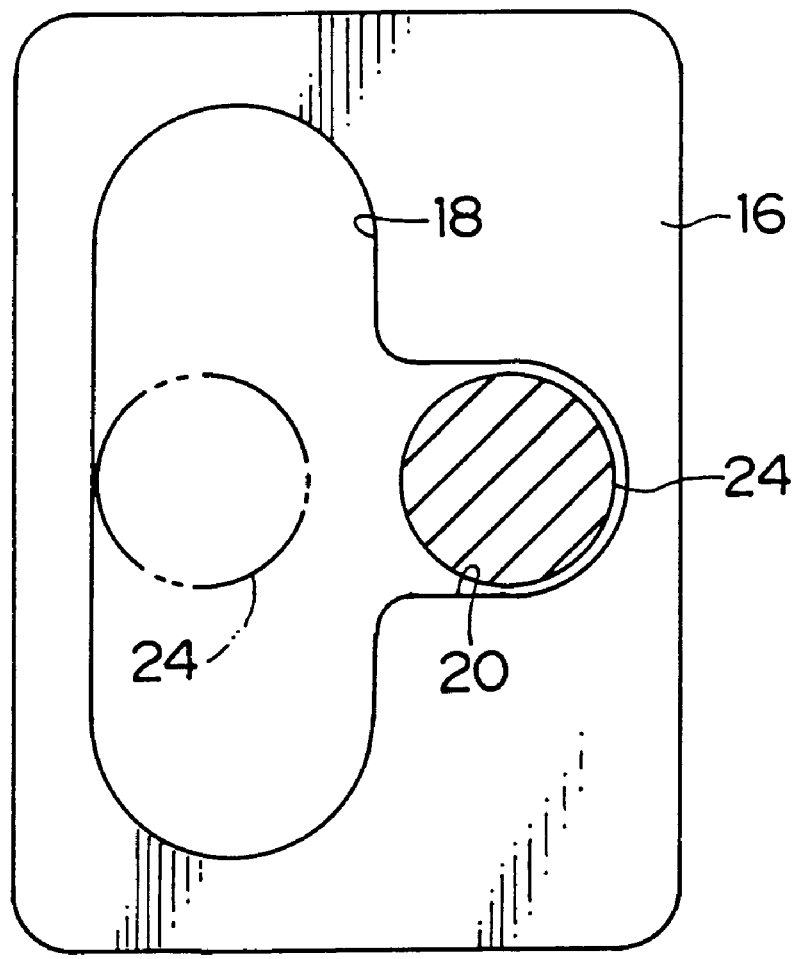

SHORT STROKE SHIFT LEVER DEVICE

BACKGROUND OF THE INVENTION

1. Field of the Invention

The present invention relates to a shift lever device which operates a transmission of a vehicle.

2. Description of the Related Art

In a vehicle in which an automatic transmission having a plurality of shift ranges is used, usually, a shift lever device is provided which can change the shift range of the automatic transmission by swinging a bar-shaped shift lever in a longitudinal direction or transverse direction of a vehicle, the shift lever being disposed at the side of a driver's seat with the longitudinal direction thereof coinciding with a vertical direction of the vehicle.

On the other hand, a conventional shift lever device requires, in a portion of the vehicle in which devices are installed, a space which allows a shift lever to swing in the longitudinal direction or transverse direction of the vehicle. For this reason, the configuration of a vehicle interior in the periphery of the portion for installation of devices is restricted.

SUMMARY OF THE INVENTION

In view of the above-described circumstances, it is an object of the present invention to provide a shift lever device which is installed in a small space.

A shift lever device described in claim 1 of the present invention effects a gear-shift operation for a transmission of a vehicle by a shift operation of a shift lever, the shift lever device comprising: (a) control means connected to the transmission and allowed to reciprocate only in a predetermined range, a plurality of moving positions in the predetermined range being each set as a gear-shift position of the transmission; and (b) driving means for moving said control means one step toward an adjacent shift position due to receiving either a forward movement of the shift lever or a backward movement of the shift lever after the forward movement.

According to the shift lever device having the above-described structure, when the shift lever moves forward from an intermediate portion in a predetermined moving range to one end, or when the shift lever moves backward toward the intermediate portion after the forward movement, the control means is displaced by a predetermined amount and the shift range of a vehicle transmission is changed one step. On the other hand, when the shift lever moves forward from the intermediate portion of the moving range (i.e., the predetermined range) to the other end, or when the shift lever moves backward toward the intermediate portion after the forward movement, the control means is displaced by a predetermined amount and the shift range of the vehicle transmission is changed one step in a direction opposite to the aforementioned. Accordingly, by repeating the reciprocating movement of the shift lever, the transmission can be changed to a desired shift range.

Here, even when the shift lever device of the present invention is applied to a transmission having a plurality of (particularly, four or more) shift ranges, it suffices that the range in which the shift lever reciprocates includes a stroke for changing the shift range one step and a stoke for changing the shift range one step in the opposite direction, i.e., a stroke of two steps of shift ranges. For this reason, the stroke of movement of the shift lever (i.e., a predetermined moving range) can be reduced and the space for installation of the shift lever device at the side of a vehicle interior can be made smaller.

A shift lever device described in claim 2 is characterized by that, in the shift lever device according to claim 1, the shift lever can reciprocate from a neutral position to both one direction and another direction, moving the shift position one step by a reciprocating movement in the one direction and moving the shift position one step in an opposite direction by a reciprocating movement in the other direction.

A shift lever device described in claim 3 is characterized by, in the shift lever device according to claim 1, further comprising connecting means which connects the shift lever to the control means when moving said control means to a gear shift position and which releases the connected state of said control means before and after the movement of said control means.

In the shift lever device having the above-described structure, when the control means is displaced to change the shift range, in other words, when the shift lever moves forward in the structure in which the control means is displaced during the forward movement of the shift lever, or when the shift lever moves backward in the structure in which the control means is displaced during the backward movement of the shift lever after the forward movement thereof, the shift lever is connected to the control means by the connecting means and the operation of the shift lever for changing the shift range is transmitted to the control means.

Further, before and after displacement of the control means, namely, before and after the forward movement or backward movement of the shift lever for displacement of the control means, the state in which the shift lever and the control means are connected by the connecting means is released, and there is no possibility that the reciprocating movement of the shift lever in the connection-released state be transmitted to the control means. For this reason, the change of the shift range by an inadvertent operation of the shift lever is prevented.

A shift lever device described in claim 4 is characterized by that, in the shift lever device according to claim 3, when the shift lever is moved in a predetermined direction different from the reciprocating direction of the shift lever, said connecting means connects the shift lever to said control means.

In the shift lever device having the above-described structure, when the shift lever is moved in a predetermined direction different from that in which the shift lever reciprocates at the time of displacement of the control means, the shift lever is connected to the control means by the connecting means. When the shift lever is allowed to reciprocate in this state, the control means is displaced and the shift range of the transmission is changed.

A shift lever device described in claim 5 is characterized by that, in the shift lever device according to claim 4, said connecting means includes a protruding portion, and when the shift lever is moved in a predetermined direction different from the reciprocating direction of the shift lever, said connecting means connects the shift lever to said control means by engaging the protruding portion with a receding portion of said control means having the receding portion.

A shift lever device described in claim 6 is characterized by that, in the shift lever device according to claim 4, said connecting means is connecting members which can each rotate around a different rotating axis.

A shift lever device described in claim 7 is characterized by that, in the shift lever device according to claim 6, said connecting means includes a ball bearing.

A shift lever device described in claim 8 is characterized by that, in the shift lever device according to claim 1, said control means is rotatable in a predetermined range, and due to rotating movement of said control means to a plurality of moving positions within the predetermined range, said control means is displaced to a gear-shift position of the transmission.

A shift lever device described in claim 9 is characterized by that, in the shift lever device according to claim 1, said control means is controlled by a shift-lock control device which engages with and locks said control means in a state of being displaced to a predetermined gear-shift position and which releases locking through treading of a brake pedal of a vehicle.

A shift lever device described in claim 10 is characterized by that, in the shift lever device according to claim 3, operating means is provided in the shift lever as a portion of said driving means, said operating means being movable along the shift lever with respect to the shift lever such that when said operating means moves with respect to the shift lever, said connecting means connects the shift lever to said control means.

In the shift lever device having the above-described structure, when the operating means is moved along the shift lever, the shift lever is connected by the connecting means to the control means. When the shift lever is allowed to reciprocate in this state, the control means is displaced and the shift range of the transmission is changed.

A shift lever device described in claim 11 is characterized by that, in the shift lever device according to claim 10, said operating means is a bar-shaped body accommodated in an interior of the shift lever in such a manner as to be slidable along a longitudinal direction of the shift lever.

A shift lever device described in claim 12 is characterized by that, in the shift lever device according to claim 1, said driving means includes a driving mechanism which moves said control means by one shift position at the time of movement in one direction within one reciprocating movement of the shift lever and which does not move said control means at the time of movement in another direction.

A shift lever device described in claim 13 is characterized by that, in the shift lever device according to claim 1, said driving means connects the shift lever and said control means at the time of movement in the one direction, and releases the connection of the shift lever and said control means at the time of movement in the other direction.

A shift lever device described in claim 14 is characterized by that, in the shift lever device according to claim 13, a cam is provided which engages and releases the shift lever and said control means with respect to each other.

A shift lever device described in claim 15 is a shift lever device which effects a gear-shift operation for a transmission of a vehicle by a shift operation of a shift lever, comprising: (a) control means connected to the transmission and allowed to reciprocate only in a predetermined range, a plurality of moving positions in the predetermined range being each set as a gear-shift position of the transmission; and (b) driving means for moving said control means one step toward an adjacent shift position due to a reciprocating movement of the shift lever and an additional operation applied to the shift lever.

A shift lever device described in claim 16 is characterized by that, in the shift lever device according to claim 15, said driving means includes a driving mechanism which connects the shift lever to said control means through a movement operation of the shift lever in a direction different from the reciprocating direction of the shift lever and which moves said control means one step toward an adjacent shift position through a reciprocating movement operation of the shift lever.

A shift lever device described in claim 17 is characterized by that, in the shift lever device according to claim 15, said driving means includes operating means which is provided in the shift lever as a portion of said driving means, said operating means being movable along the shift lever with respect to the shift lever, and also includes a driving mechanism in which, when the operating means moves with respect to the shift lever, said connecting means connects the shift lever to said control means, and due to the reciprocating movement operation of the shift lever, said control means is moved one step toward an adjacent shift position.

A shift lever device described in claim 18 is a shift lever device which effects a gear-shift operation for a transmission of a vehicle by a shift operation of a shift lever, comprising: (a) control means connected to the transmission and allowed to reciprocate only in a predetermined range, a plurality of moving positions in the predetermined range being each set as a gear-shift position of the transmission; and (b) driving means for moving said control means one step toward an adjacent shift position only with a reciprocating movement operation of the shift lever.

A shift lever device described in claim 19 is characterized by that, in the shift lever device according to claim 18, said driving means includes a driving mechanism providing a cam as a portion of said driving means, the driving mechanism engaging and releasing the shift lever and said control means with respect to each other via the cam and due to the reciprocating movement operation of the shift lever and also moving said control means one step toward an adjacent shift position.

A shift lever device described in claim 20 is characterized by that, in the shift lever device according to claim 18, said driving means includes a driving mechanism in which engagement of the shift lever and said control means is released via the cam during a portion of movement within reciprocating movement of the shift lever, the shift lever and said control means engaged with each other during movement in another direction, and said control means moving one step toward an adjacent shift position in the engaged state.

BRIEF DESCRIPTION OF THE DRAWINGS

FIG. 2 is a plan view of a housing.

DESCRIPTION OF THE PREFERRED EMBODIMENTS

Figure 6:
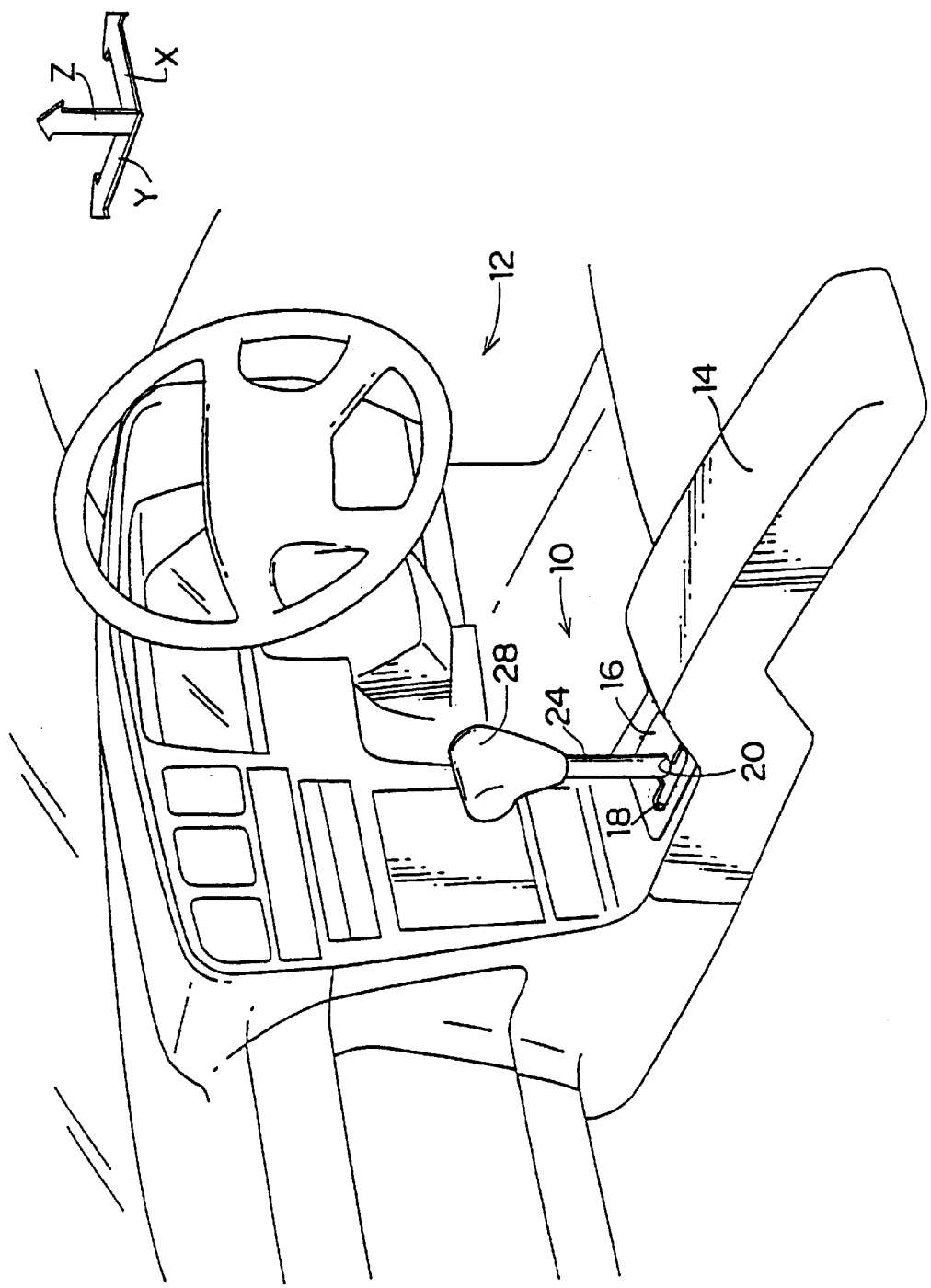
FIG. 6 is a perspective view of an interior portion of a vehicle, to which the shift lever device according to the first embodiment of the present invention is applied.

FIG. 6 shows an interior portion of a vehicle 12 to which a shift lever device 10 according to a first embodiment of the present invention is applied. It should be noted that arrows "X", "Y", and "Z" shown in the accompanying drawings, respectively represent: the right-hand direction in the transverse direction of the vehicle 12; a forward direction in the longitudinal direction of the vehicle 12 ; and the upward direction in the vertical direction of the vehicle 12.

As shown in FIG. 6, the shift lever device 10 includes a housing 16 provided on a floor at the front side of a center console box 14. As shown in FIG. 2, a shift groove 18 whose longitudinal direction coincides with the longitudinal direction of the vehicle (i.e., the direction indicated by arrow Y in FIG. 2 and the direction opposite thereto) is formed in the housing 16. Further, a select groove 20 whose longitudinal direction coincides with the transverse direction of the vehicle (i.e., the direction indicated by arrow X in FIG. 2 and the direction opposite thereto) is formed to extend from a longitudinal-direction intermediate portion of the shift groove 18 and the transverse dimension of the select groove 20 is smaller than that of the shift groove 18.

Figure 1:
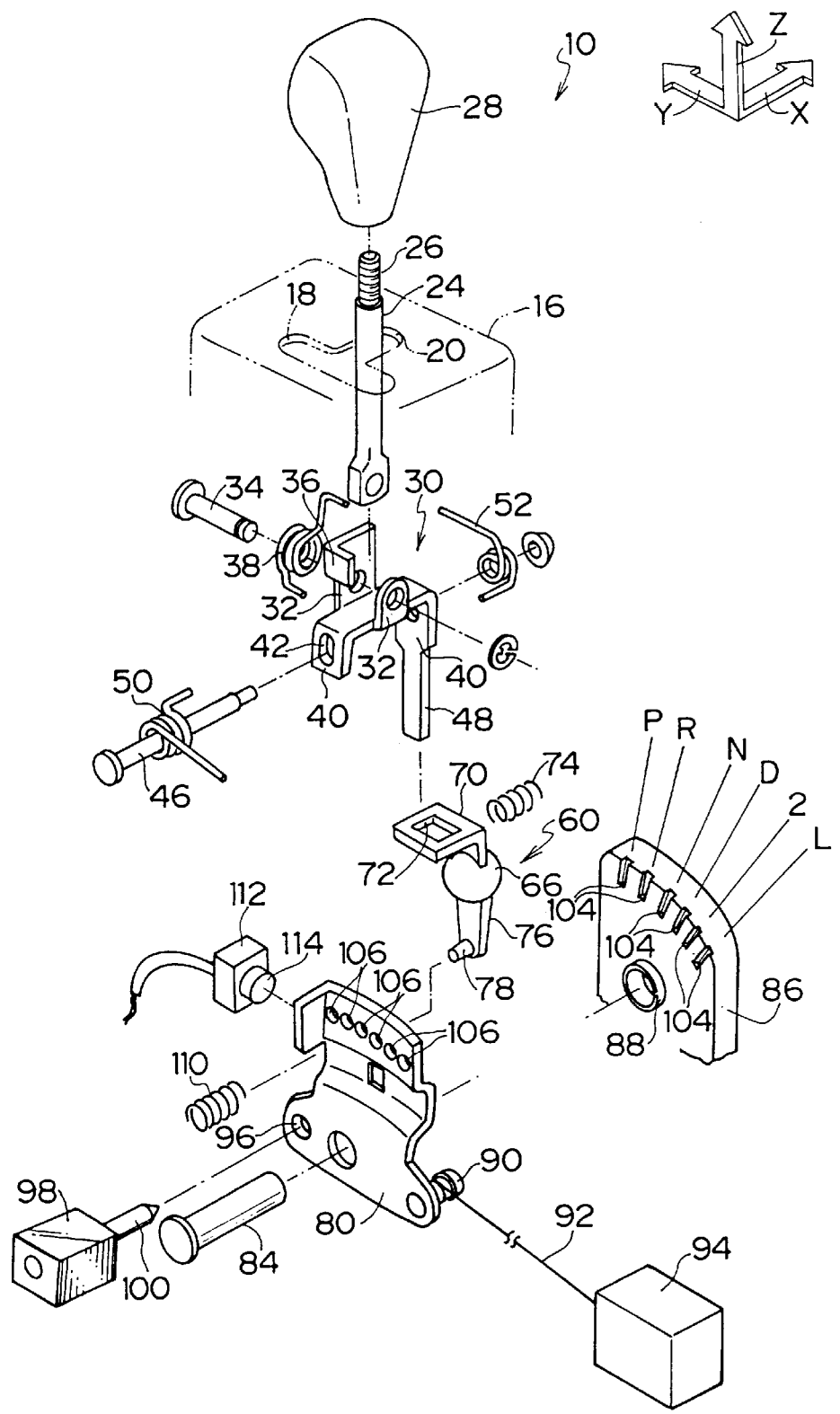
FIG. 1 is an exploded perspective view of a shift lever device according to a first embodiment of the present invention.

As shown in FIG. 1, a round bar-shaped shift lever 24 whose longitudinal direction coincides with the vertical direction of the vehicle (i.e., the direction indicated by arrow Z in FIG. 1 and the direction opposite thereto) passes through the shift groove 18 and the select groove 20. The shift lever 24 is allowed to be moved along the shift groove 18 in the longitudinal direction of the vehicle and also moved along the select groove 20 in the transverse direction of the vehicle. As shown in FIG. 2, the transverse dimension of the select groove 20 is formed to be slightly larger than the outside diameter of the shift lever 24, and therefore, the shift lever 24 can smoothly move along the select groove 20 in the transverse direction of the vehicle. The transverse dimension of the shift groove 18 is formed to be sufficiently larger than the outside diameter of the shift lever 24, and therefore, the shift lever 24 not only can move along the shift groove 18 in the longitudinal direction of the vehicle, but also can move along the transverse direction of the shift groove 18 by a small amount.

As shown in FIG. 1, a male screw 26 is formed in the upper end portion of the shift lever 24 and a knob 28 is screwed to the male screw 26. For this reason, a occupant of the vehicle 12 can operate the shift lever 24 in the longitudinal and transverse directions of the vehicle by holding the knob 28.

Figure 3:
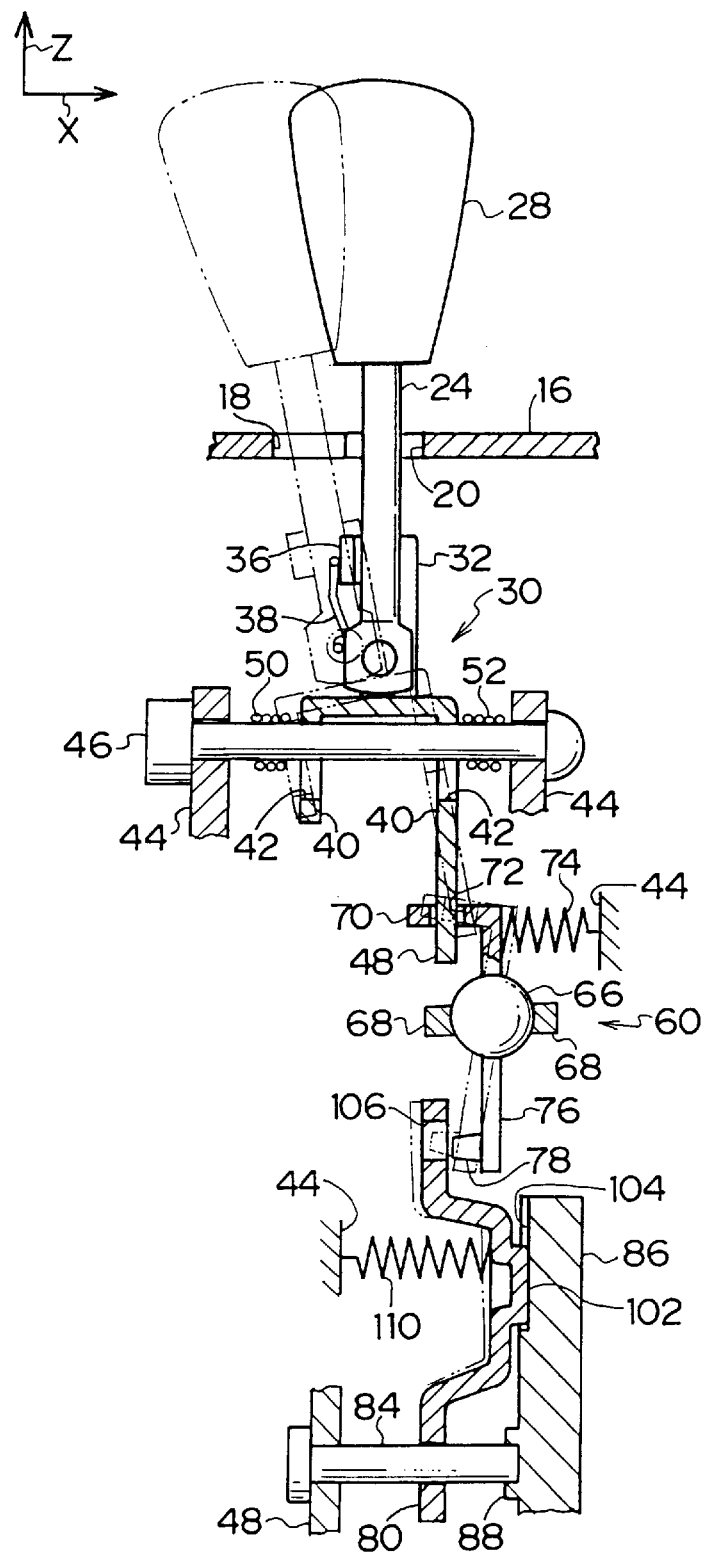
FIG. 3 is a rear view of the shift lever device according to the first embodiment of the present invention.
Figure 4:
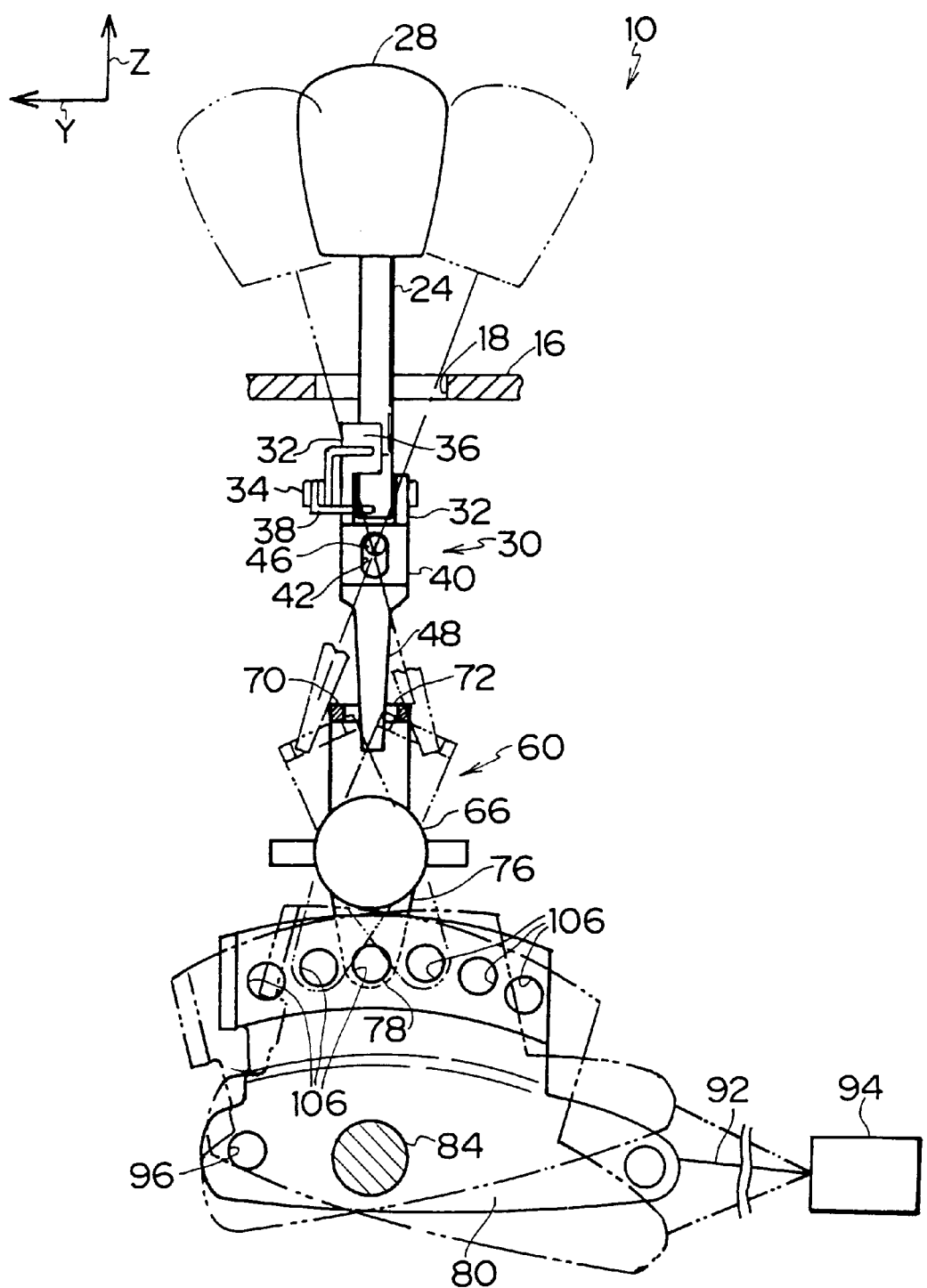
FIG. 4 is a side view of the shift lever device according to the first embodiment of the present invention.

Further, as shown in FIGS. 1 and 4, a joint 30 is provided below the shift lever 24. A pair of vertical walls 32 is formed in the joint 30 and holds the lower end portion of the knob 28 from the front and rear sides of the vehicle. A shaft 34 passes through these vertical walls 32 and the lower end portion of the shift lever 24. As a result, the shift lever 24 is connected to the joint 30 in such a manner as to be rotatable around the shaft 34. Further, a vertical wall 36 is formed to extend from a left-hand end portion of the front-side vertical wall 32 in the transverse direction of the vehicle to the rear side of the vehicle. As indicated by the two-dot chain line in FIG. 3, when the shift lever 24 rotates around the shaft 34 toward the left side in the transverse direction of the vehicle, the vertical wall 36 is pressed by the shift lever 24 and the joint 30 thereby inclines. Further, a helical coil spring 38 is provided around the vertical wall 32 in such a manner that one end thereof contacts the shift lever 24 from the left side in the transverse direction of the vehicle and the other end thereof contacts the vertical wall 36 from the left side in the transverse direction of the vehicle. The helical coil spring 38 constantly urges the shift lever 24 against the vertical wall 36 toward the right side in the transverse direction of the vehicle.

As shown in FIGS. 1 and 3, a pair of vertical walls 40 facing each other in the transverse direction of the vehicle is formed in the join 30 below the vertical walls 32. An oblong hole 42 whose longitudinal direction coincides with the vertical direction of the vehicle is formed in each of the vertical walls 40 and a shaft 46 whose both ends are supported by a vehicle body 44 (see FIG. 3) passes through the oblong holes 42. As a result, the joint 30 can rotate around the shaft 46 and the shaft 46 can move vertically between one end and the other end of each oblong hole 42 in the longitudinal direction thereof. Further, a helical coil spring 50 is provided around the shaft 46 further at the left side than the vertical wall 40 disposed at the left side in the transverse direction of the vehicle in such a manner that one end thereof is fixed to the vehicle body 44 and the other end thereof contacts a peripheral end portion of the vertical wall 40 from the front side of the vehicle. The helical coil spring 50 urges the joint 30 toward the rear side of the vehicle. Moreover, a helical coil spring 52 is provided around the shaft 46 further at the right side of the vertical wall 40 disposed at the right side in the transverse direction of the vehicle in such a manner that one end thereof is fixed to the vehicle body 44 and the other end thereof contacts a peripheral end portion of the vertical wall 40 from the rear side. The helical coil spring 52 urges the joint 30 toward the front side of the vehicle. Here, these helical coil springs 50 and 52 are set so that, when the shift lever 24 is located at a position where the shift groove 18 and the select groove 20 cross each other, each urging force thereof is well-balanced. For this reason, when an extra external force (for example, force of a vehicle occupant pushing or pulling the shift lever 24) is not applied to the shift lever 24, the shift lever 24 is located at the position where the shift groove 18 and the select groove 20 cross each other, and further abuts against the right-side end portion of the select groove 20 due to the urging force of the helical coil spring 38.

Further, a lever 48 extends downward from the lower end of the vertical wall 40 disposed at the right side in the transverse direction of the vehicle and is connected to a ball shaft 60 provided below the joint 30 to serve as a connecting means.

As shown in FIG. 3, the ball shaft 60 includes a spherical body 66 held in a state of being caught by a pair of concave bearings 68 which are formed in the vehicle body 44. The ball shaft 60 can rotate around the spherical body 66 in all directions. Further, an engaging portion 70 extends upward from an outer peripheral portion of the spherical body 66. The upper end portion of the engaging portion 70 is bent toward the left side substantially at a right angle. A rectangular through hole 72 is formed in the bent portion of the engaging portion 70 and the lever 48 extending from the joint 30 passes through the through hole 72. For this reason, when the joint 30 rotates around the shaft 34 or around the shaft 46, the engaging portion 70 is pressed by the lever 48 and the ball shaft 60 rotates around the spherical body 66.

A compression coil spring 74 whose one end is fixed to the vehicle body 44 is provided at the right side of the engaging portion 70 in the transverse direction of the vehicle. The engaging portion 70 is constantly urged by the urging force of the compression coil spring 74 toward the left side in the transverse direction of the vehicle.

A lever 76 extends downward from an outer peripheral portion of the spherical body 66 at the side opposite to the engaging portion 70 (i.e., at the lower side of the spherical body 66). Further, a pin 78 projects from the lower end portion of the lever 76 toward the left side in the transverse direction of the vehicle.

A base 86 formed integrally with the vehicle body 44 is provided below the ball shaft 60 and a control plate 80 serving as control means is provided at the left side of the base 86 in the transverse direction of the vehicle. As shown in FIG. 3, the control plate 80 is a plate-like member whose intermediate portion in the vertical direction is bent to project toward the right side in the transverse direction of the vehicle. A shaft 84 supported by a bearing 88 of the base 86 passes through the lower end of the control plate 80 at the intermediate portion thereof in the longitudinal direction of the vehicle, so that the control plate 80 can rotate freely around the shaft 84.

As shown in FIG. 1, a pin 90 is formed so as to project from the lower end portion of the control plate 80 toward the right side in the transverse direction of the vehicle at the side of the rear end of the control plate 80. The pin 90 is connected via a wire 92 to an automatic transmission 94 of the vehicle. When the control plate 80 rotates (is displaced) around the shaft 84, the shift range of the automatic transmission 94 is changed in accordance with an amount of rotation (displacement) of the control plate 80.

As also shown in FIG. 1, a through hole 96 is formed at the side of the longitudinal-direction front end of the control plate 80. A shift-lock solenoid 98 is provided at the left side of the control plate 80 in the transverse direction of the vehicle and is connected via a cable to control means such as a shift-lock computer (not shown). The shift-lock solenoid 98 includes a bar-shaped shiftlock stopper 100 whose longitudinal direction coincides with the transverse direction of the vehicle. With the shift-lock stopper 100 facing the through hole 96 of the control plate 80, the shift-lock stopper 100 can pass through the through hole 96 so as to prevent rotation of the control plate 80, thereby resulting in a shift-lock state.

Figure 5:
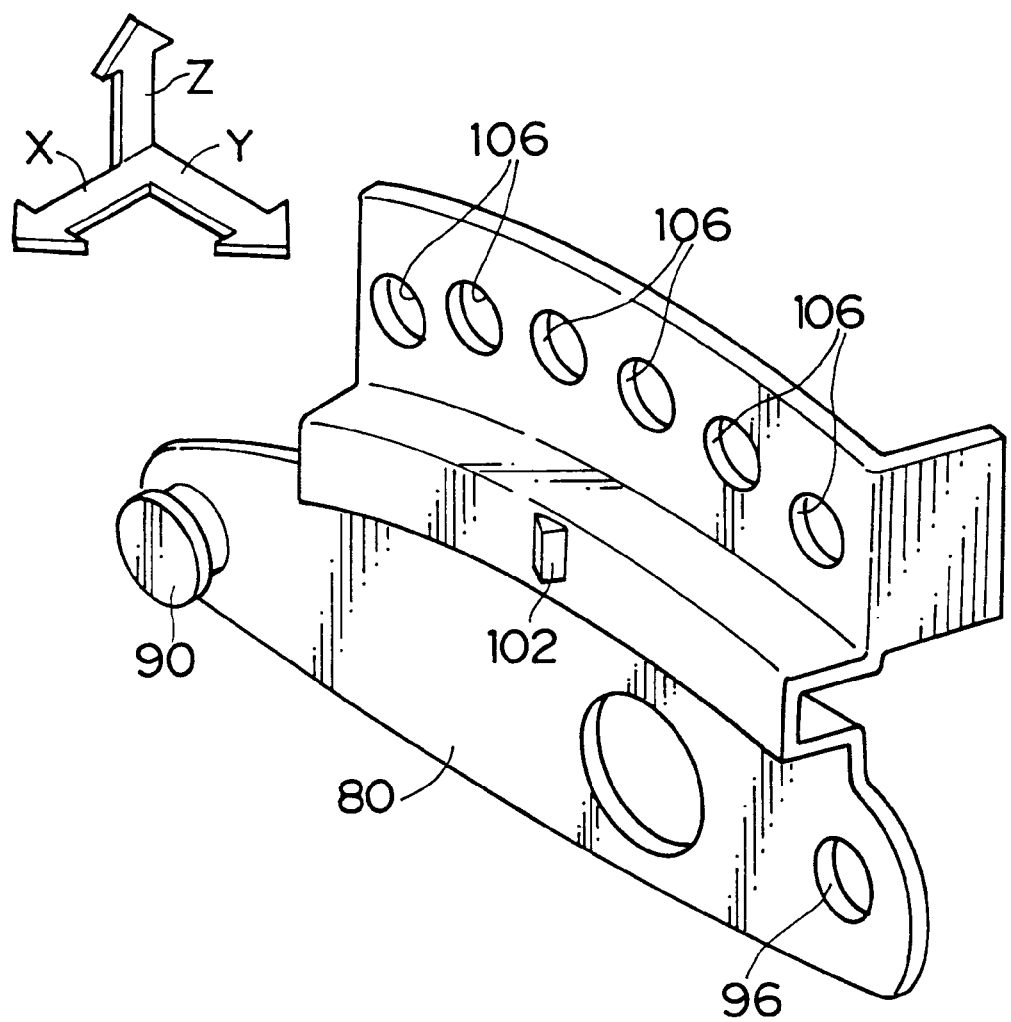
FIG. 5 is a perspective view of a control plate when seen from the direction opposite to the side shown in FIG. 1.

Further, as shown in FIG. 5, a protrusion 102 having the shape of a substantially triangular prism and projecting toward the right side in the transverse direction of the vehicle is formed at the vertical-direction intermediate portion of the control plate 80 (i.e., the portion bent toward the right side in the transverse direction of the vehicle) and also at an intermediate portion of the control plate 80 in the longitudinal direction of the vehicle. The protrusion 102 can come into any one of a plurality of grooves 104 which are formed around the bearing 88 in the upper end portion of the base 86 at intervals of a predetermined angle. When the control plate 80 is about to be rotated around the shaft 84, the protrusion 102 moves with respect to the groove 104 while an inclined surface of the protrusion 102 is contacting a corner portion of the groove 104, and is thereby disengaged from the groove 104. These grooves 104 correspond to the shift ranges of the automatic transmission 94, and when the protrusion 102 comes into any specified groove 104 among the grooves 104, the control plate 80 is placed in a specified rotating state with the shaft 84 as the center and the automatic transmission 94 is thereby set in a specified shift range via the wire 92. Accordingly, when the control plate 80 rotates around the shaft 84 and the protrusion 102 moves from a certain groove 104 to an adjacent groove 104, the shift range of the automatic transmission 94 is changed one step. Meanwhile, characters "P", "R", . . . , "2", and "L" given to designate the grooves 104 in FIG. 1 indicate the shift ranges of the automatic transmission 94. For example, when the protrusion 102 comes into the groove 104 corresponding to "P", the automatic transmission 94 is set in the P range (i.e., parking range), and when the protrusion 102 comes into the groove 104 corresponding to "L", the automatic transmission 94 is set in the L range (i.e., low range).

A compression coil spring 110 whose one end is fixed to the vehicle body 44 is provided at the transverse-direction left side of the vertical-direction intermediate portion of the control plate 80 (i.e., the portion bent toward the right side in the transverse direction of the vehicle). The control plate 80 is constantly urged by the urging force of the compression coil spring 110 toward the right side in the transverse direction of the vehicle. Accordingly, when the control plate 80 is rotated with the protrusion 102 disengaged from the groove 104 and the protrusion 102 faces again the groove 104, the protrusion 102 comes into the groove 104 due to the urging force of the compression coil spring 110.

A plurality of through holes 106 having the same number as that of the above-described grooves 104 are formed in the upper end of the control plate 80. When the protrusion 102 is fitted into the I-th groove 104 (I is a natural number from 1 to 6) from the front side of the vehicle, the I-th through hole 106 from the front side and the pin 78 face each other. In this state, when the lever 76 rotates around the spherical body 66 toward the left side in the transverse direction of the vehicle, the pin 78 comes into the through hole 106.

Further, the upper end side of the front end of the control plate 80 extends toward the left side in the transverse direction of the vehicle. A position detecting switch 112 is provided at the front side of the extending portion of the control plate 80 and is connected to the shift-lock solenoid 98 via control means such as a shift-lock computer. The position detecting switch 112 includes a button 114 projecting toward the rear side of the vehicle. When the protrusion 102 comes into the groove 104 corresponding to the P range (i.e., the front groove 104), the front end portion of the control plate 80 presses the button 114 so that the position detecting switch 112 is brought into an ON state, and therefore, the shift-lock stopper 100 of the shift-lock solenoid 98 projects via the shift-lock computer and passes through the through hole 96, thereby resulting in a shift-lock state. As a result, in this state, even if the protrusion 102 is disengaged from the groove 104, the control plate 80 cannot rotate. Accordingly, the change of the shift range of the automatic transmission 94 can be prevented.

Next, an operation of the present embodiment will be described.

In the shift lever device 10 of the present embodiment, usually, the protrusion 102 comes into any one of the grooves 104 and the shift lever 24 comes into the select groove 20 due to each urging force of the helical coil springs 50 and 52 and of the helical coil spring 38.

When the shift range of the automatic transmission 94 is changed from the above-described state, first, the shift lever 24 is pressed toward the left side in the transverse direction of the vehicle against the urging force of the helical coil spring 38 and is moved until it abuts against the left-side end portion of the shift groove 18. As indicated by the two-dot chain line in FIG. 3, the moved shift lever 24 presses the vertical wall 36 of the joint 30 and inclines the entire joint 30 so that the upper end of the joint 30 faces toward the left in the transverse direction of the vehicle and the lower end thereof faces toward the right in the transverse direction of the vehicle. As a result, the lever 48 presses the engaging portion 70 toward the right in the transverse direction of the vehicle to rotate the ball shaft 60 around the spherical body 66, and the lever 76 moves in close to the control plate 80 so that the pin 78 comes into a corresponding through hole 106.

Subsequently, as indicated by the two-dot chain line in FIG. 4, when the shift lever 24 is pushed toward the front side up to the front end portion of the shift groove 18, the vertical wall 32 at the front side in one pair of vertical walls 32 is pressed by the shift lever 24 and the joint 30 rotates around the shaft 46 against the urging force of the helical coil spring 50. When the joint 30 rotates, the lever 48 presses the engaging portion 70 toward the rear side of the vehicle to rotate the ball shaft 60 around the spherical body 66, and the pin 78 of the lever 76 rotates the control plate 80 around the shaft 84. In this state, the protrusion 102 faces a groove 104 adjacent to and at the front side of the groove 104 into which the protrusion 102 has initially come, and the protrusion 102 comes into the groove 104, which the protrusion 102 faces, due to the urging force of the compression coil spring 110, and the control plate 80 is thereby fixed. As a result, the shift range of the automatic transmission 94 is, for example, changed from the N range to the P range via the wire 92.

Further, in this state, when force for pressing the shift lever 24 toward the left in the transverse direction of the vehicle is released, the shift lever 24 moves to abut against the end portion of the shift groove 18 at the right side in the transverse direction of the vehicle due to the urging force of the helical coil spring 38. In this state, force of the lever 48 of the joint 30 pressing the engaging portion 70 decreases, and therefore, the ball shaft 60 rotates around the spherical body 66 due to the urging force of the compression coil spring 74 and the lever 76 rotates toward the left side in the transverse direction of the vehicle. Further, when the lever 76 rotates, the pin 78 is disengaged from the through hole 106 due to the urging force of the compression coil spring 74. In this state, when force for pressing the shift lever 24 toward the front side is released, the shift lever 24 moves, due to each urging force of the helical coil spring 50 and the helical coil spring 52, to a position where each urging force of the helical coil spring 50 and the helical coil spring 52 is well-balanced, i.e., a position where the shift groove 18 and the select groove 20 cross each other. Subsequently, the shift lever 24 comes into the select groove 20 due to the urging force of the helical coil spring 38. In this state, even if the shift lever 24 is merely pressed in the longitudinal direction of the vehicle, the shift lever 24 does not swing. Moreover, the pin 78 is disengaged from the through hole 106, and therefore, the control plate 80 does not rotate and the shift range of the automatic transmission 94 does not change.

When the shift range of the automatic transmission 94 is changed jumping an intermediate shift range, for example, the shift range of the automatic transmission 94 is changed from the L range to the D range, the shift lever 24 is moved, due to the urging force of the helical coil spring 50, to the position where each urging force of the helical coil springs 50 and 52 is well-balanced, i.e., the position where the shift groove 18 and the select groove 20 cross each other, and thereafter, it suffices that the shift lever 24 is further moved to the front end portion of the shift groove 18. By repeating this operation, the transmission can be changed to a desired shift range.

Further, for example, when the shift range of the automatic transmission 94 is changed from the P range to the N range, as indicated by the three-dot chain line in FIG. 4, with the shift lever 24 abutting against the end portion of the shift groove 18 at the left side in the transverse direction of the vehicle in the portion where the shift groove 18 and the select groove 20 cross each other, it suffices that the shift lever 24 be moved to the rear end portion of the shift groove 18. In this case as well, each rotation (displacement) of the shift lever 24, the joint 30, the ball shaft 60, and the control plate 80 in the longitudinal direction of the vehicle merely becomes reverse of that in the case in which the shift lever 24 is moved to the front end portion of the shift groove 18, and the basically same operation is effected and the shift range of the automatic transmission 94 is changed to a reverse direction.

As described above, the shift lever device 10 of the present embodiment is constructed in such a manner that, by swinging the shift lever 24 from the portion where the shift groove 18 and the select groove 20 cross each other (i.e., the longitudinal direction intermediate portion of the shift groove 18) to the front end portion or rear end portion of the shift groove 18, the shift range of the automatic transmission 94 is changed one step, and by repeating this operation, the change to a desired shift range is made. For this reason, irrespective of the number of shift ranges of the automatic transmission 94, it suffices that a stroke of the shift lever 24 swinging in the longitudinal direction of the vehicle is that for two steps of shift ranges. Accordingly, the range in which the shift lever 24 swings can be made smaller than that of a conventional shift lever and a space for installation of the shift lever device 10 at the side of the vehicle interior can thereby be decreased. For this reason, the interior space of the vehicle can be effectively utilized, for example, a space in the periphery of a driver's seat of the vehicle can be widen or can be used for installation of other device.

Figure 7:
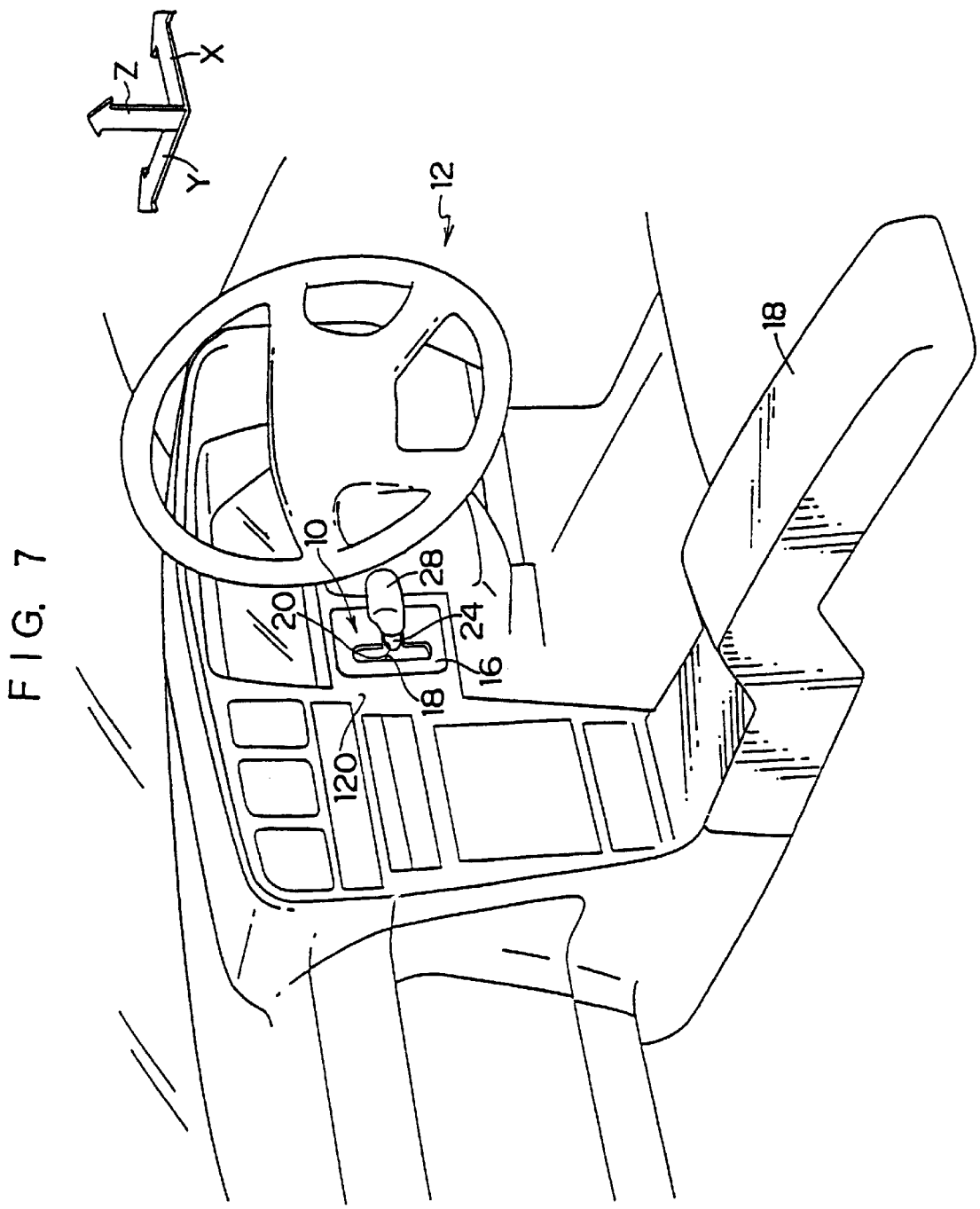
FIG. 7 is a perspective view corresponding to FIG. 6, which shows the state in which the shift lever device according to the first embodiment of the present invention is provided on an instrument panel of the vehicle.

In the present embodiment, the shift lever device 10 is provided at the front side of the center console box 14, but the position where the shift lever device 10 is installed is not limited to the position at the front side of the center console box 14. For example, as shown in FIG. 7, the shift lever device 10 may be provided on an instrument panel 120 of the vehicle. In this case, the side space of a driver's seat of the vehicle 12 is not occupied and this gives a vehicle occupant at the driver's seat a feeling of release without increasing the size of the vehicle 12. Further, as the front seat of the vehicle 12, a bench seat can be used in place of a normal seat.

Next, other embodiments of the present invention will be described. Meanwhile, the basically same portions as those of the first embodiment will be denoted by the same reference numerals, and a description thereof will be omitted.

Figure 8:
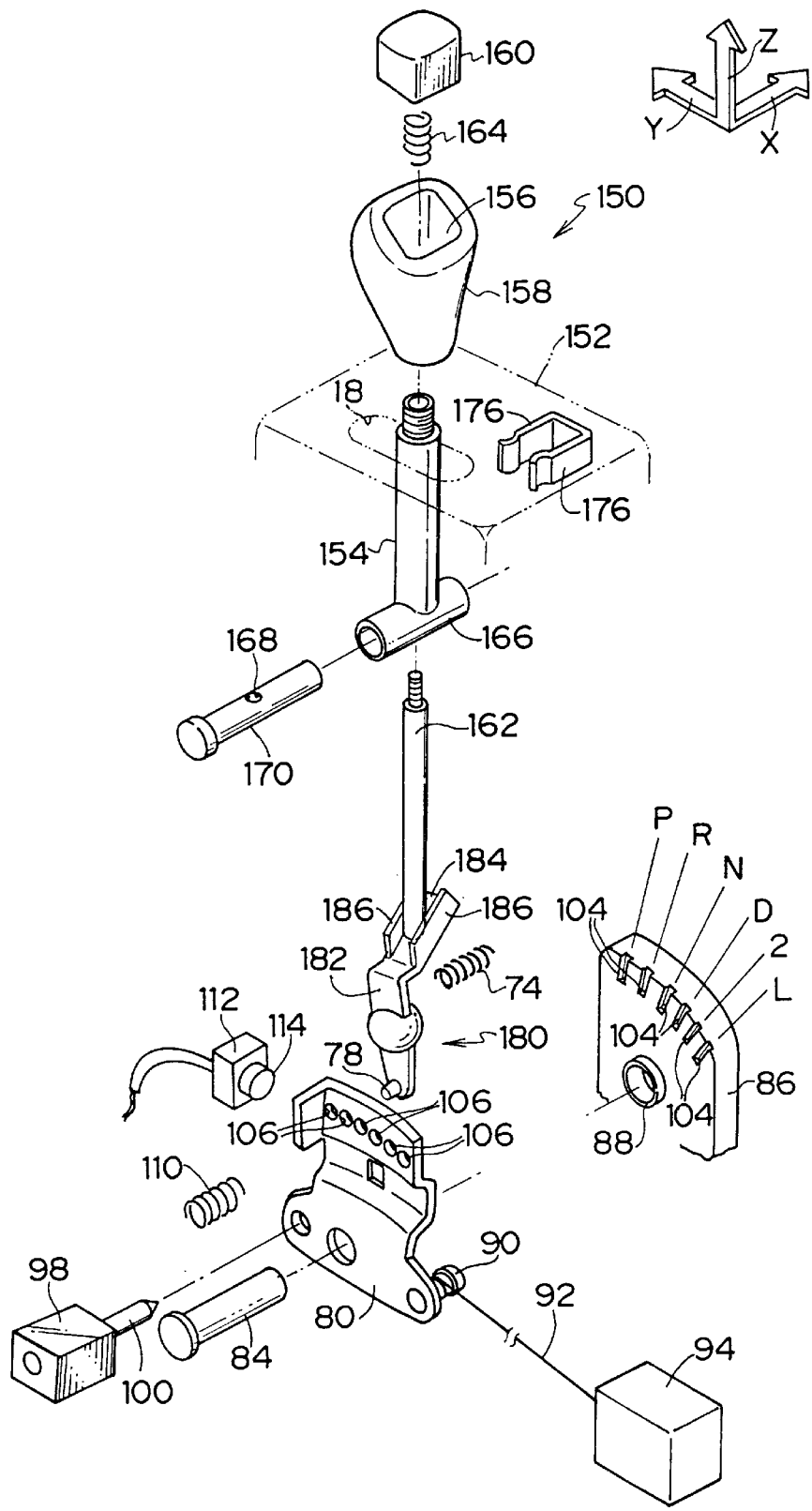
FIG. 8 is an exploded perspective view of a shift lever device according to a second embodiment of the present invention.
Figure 9:
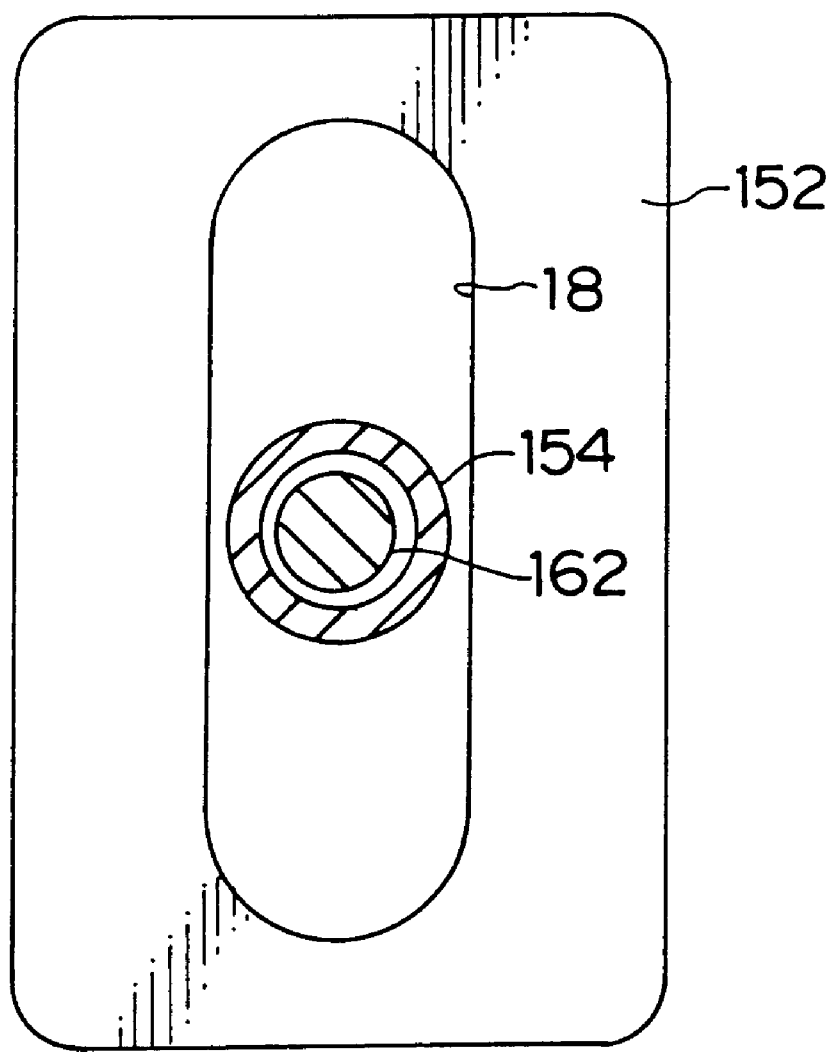
FIG. 9 is a plan view of a housing.

FIG. 8 shows a shift lever device 150 according to a second embodiment of the present invention. As shown in FIGS. 8 and 9, in this shift lever device 150, the select groove 20 as provided in the shift lever device 10 according to the first embodiment is not formed in a housing 152, and only the shift groove 18 is formed therein.

Further, a cylindrical shift lever 154 whose longitudinal direction coincides with the vertical direction passes through the shift groove 18 of the housing 152. A pair of plate springs 176 are provided at both sides of the shift lever 154 in the longitudinal direction of the vehicle and below the housing 152. The shift lever 154 is urged by the urging force of the plate springs 176 toward a predetermined position at the center in the longitudinal direction of the shift groove 18.

Figure 10:
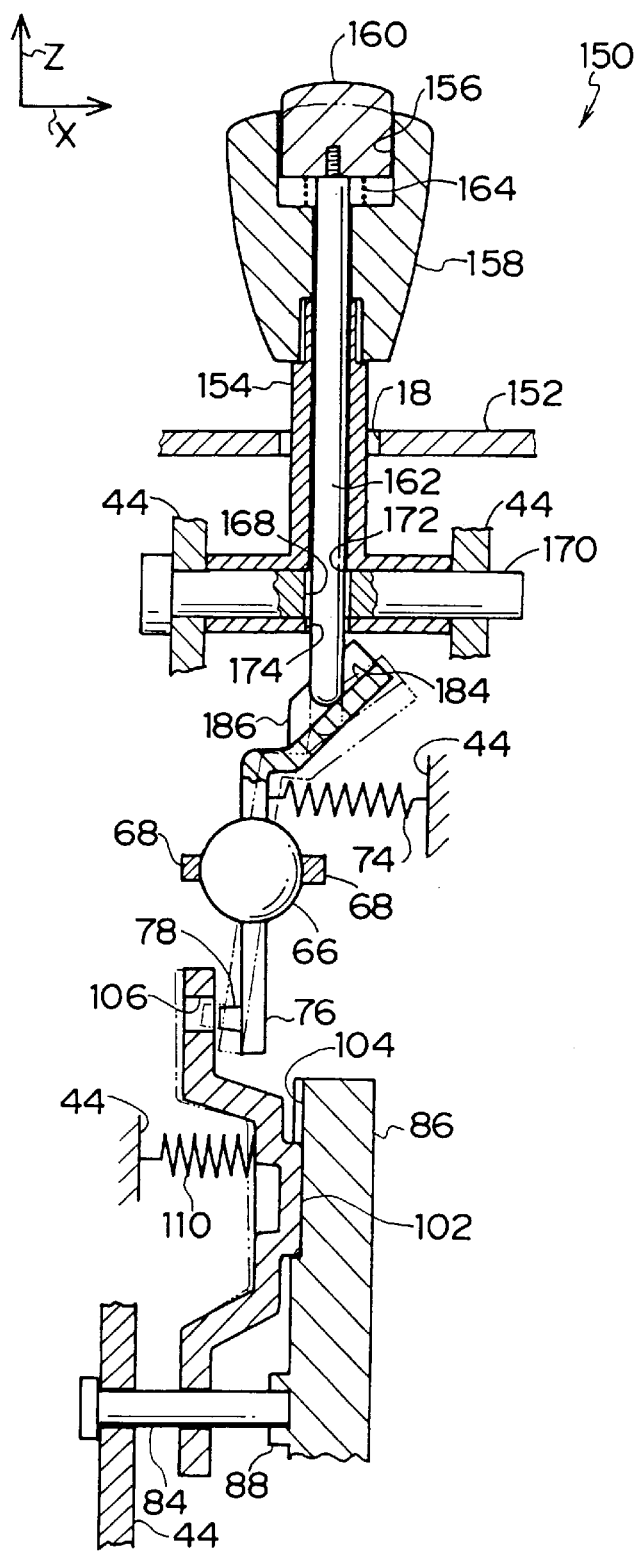
FIG. 10 is a side view of the shift lever device according to the second embodiment of the present invention.

As shown in FIGS. 8 and 10, a knob 158 having a through hole 156 which is open at both ends of the knob 158 in the vertical direction is mounted at the upper end portion of the shift lever 154. Here, as shown in FIG. 10, the through hole 156 of the knob 158 is formed in such a manner that the cross-sectional configuration thereof further at the upper side than the vertical-direction intermediate portion is substantially rectangular, and a block-shaped button 160 serving as operating means is inserted into the through hole 156. Further, the cross-sectional configuration of the through hole 156 further at the lower side than the vertical-direction intermediate portion is substantially circular, of which inner diameter is smaller than that of the upper side of the through hole 156. The lower end portion of the through hole 156 communicates with the interior portion of the shift lever 154 and a rod 162 serving as operating means to pass through the shift lever 154 is fixed to the button 160 via the through hole 156. A compression coil spring 164 is provided between the lower end of the button 160 and the intermediate portion of the knob 158 so as to urge the button 160 and the rod 162 in the upward direction. For this reason, in a normal state (the state indicated by the solid line in FIG. 10), the button 160 is positioned above the intermediate portion of the knob 158.

On the other hand, as shown in FIG. 8, a cylindrical pipe 166 whose longitudinal direction coincides with the transverse direction of the vehicle and whose inner diameter is sufficiently larger than the outer diameter of the rod 162 is fixed to the lower end portion of the shift lever 154. A shaft 170 in which a through hole 168 passing therethrough in the vertical direction is formed at the longitudinal-direction intermediate portion of the outer periphery of the shaft 170 is inserted into the pipe 166. As shown in FIG. 10, the shaft 170 is supported by the vehicle body 44 at both ends thereof in the axial direction, and therefore, the shift lever 154 can rotate around the shaft 170. Further, as shown in FIG. 10, an opening portion 172 is formed at the longitudinal direction intermediate portion of the pipe 166 and the pipe 166 communicates with the interior of the shift lever 154 via the opening portion 172. Moreover, an opening portion 174 is formed in the pipe 166 in such a manner as to face the opening portion 172. The rod 162 is inserted into the interior of the shift lever 154 via the opening portion 174, the through hole 168 of the shaft 170, and the opening portion 172.

Further, a ball shaft 180 is provided below the shift lever 154. As shown in FIG. 10, the ball shaft 180 includes a spherical body 66 supported rotatably by the bearings 68 in the same way as in the ball shaft 60 of the shift lever device 10 according to the first embodiment. A lever 182 extends upward from the outer peripheral portion of the spherical body 66. The upper end portion of the lever 182 is bent substantially perpendicularly toward the right in the transverse direction of the vehicle and a right-hand end portion of the bent portion is formed as an inclined surface 184 inclined upward and toward the right in the transverse direction of the vehicle. A vertical wall 186 extends from each of both ends of the inclined surface 184 in the longitudinal direction of the vehicle and the lower end portion of the rod 162 is held by these vertical walls 186 from both sides in the longitudinal direction of the vehicle.

Here, in a state in which the button 160 has not been pressed, the lower end portion of the rod 162 contacts the side of the upper end of the inclined surface 184. When the button 160 is pressed to push down the rod 162, the lower end of the rod 162 presses the inclined surface 184 to rotate the ball shaft 180 around the spherical body 66. As a result, the pin 78 comes into the through hole 106 of the control plate 80. In this state, when the shift lever 154 is pressed toward the front side of the vehicle or is pulled toward the rear side of the vehicle against the urging force of the plate springs 176 so as to be moved to the front end or rear end of the shift groove 18, the vertical walls 186 of the lever 182 are pressed by the lower end portion of the rod 162 and the ball shaft 180 is thereby rotated around the spherical body 66. As a result, the pin 76 presses to rotate the control plate 80 around the shaft 84, and the protrusion 102 comes into a groove 104 adjacent to the groove 104 into which the protrusion 102 has initially come, thereby resulting in the shift range of the automatic transmission 94 being changed one step.

Subsequently, in the above-described state, when the press of the button 160 is released and the rod 162 moves upward due to the urging force of the compression coil spring 164, the ball shaft 60 rotates around the spherical body 66 due to the urging force of the compression coil spring 74 and the pin 78 is disengaged from the through hole 106. When, with the pin 78 disengaged from the through hole 106, force for pressing or pulling the shift lever 154 is released, the shift lever 154 is moved back to the intermediate portion of the shift groove 18 due to the urging force of the plate springs 176.

By repeating the above-described operation, the shift range of the automatic transmission 94 can be changed to a desired shift range.

As described above, the shift lever device 150 according to the present embodiment is also constructed in such a manner that, by swinging the shift lever 154 to the front end or rear end of the shift groove 18, the shift range of the automatic transmission 94 is changed one step, and this operation is repeated to allow change to a desired shift range. For this reason, irrespective of the number of shift ranges of the automatic transmission 94, it suffices that a stroke of the shift lever 24 swinging in the longitudinal direction of the vehicle is that for two steps of shift ranges. Accordingly, the range in which the shift lever 24 swings can be made smaller than that of a conventional shift lever and a space for installation of the shift lever device 10 at the side of the vehicle interior can thereby be decreased. For this reason, the interior space of the vehicle can be effectively utilized, for example, a space in the periphery of a driver's seat of the vehicle can be widen or can be used for installation of other device.

Next, a third embodiment of the present invention will be described.

Figure 11:
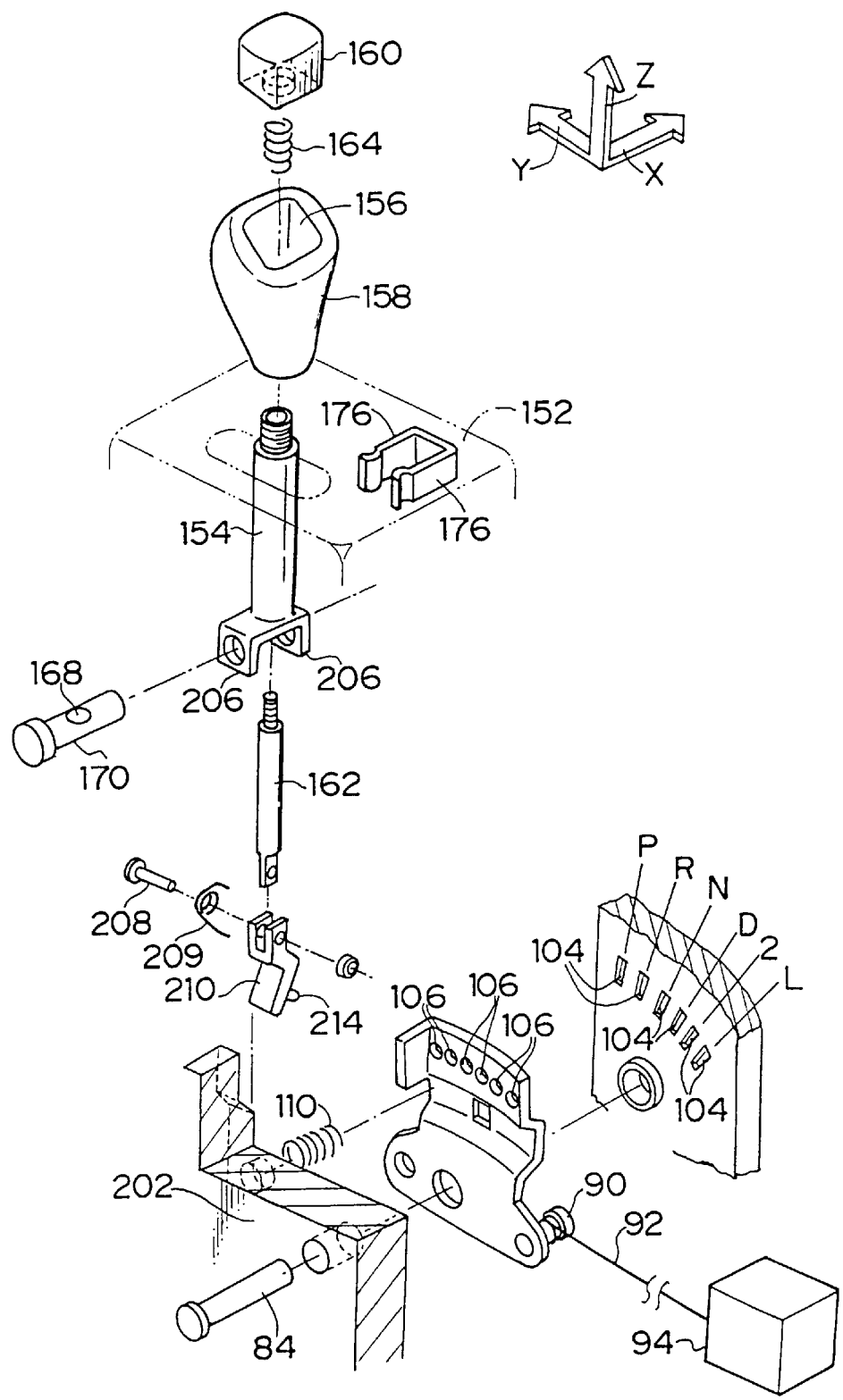
FIG. 11 is an exploded perspective view of a shift lever device according to a third embodiment of the present invention.

FIG. 11 shows an exploded perspective view of a shift lever device 200 according to the third embodiment of the present invention. As shown in this figure, the shift lever device 200 includes a base 202 formed integrally with the vehicle body 44. A groove 204 which is open at an upper side is formed in the base 202. The base 202 is supported by a shaft 170 passing through the base 202, with the lower end side of the shift lever 154 coming into the interior of the groove 204, in such a manner as to be rotatable around the shaft 170. Although the lower end portion of the shift lever 154 in the shift lever device 150 of the second embodiment is formed as the pipe 166, in the shift lever device 200 of the third embodiment, the lower end portion of the shift lever 154 has a substantially U-shaped configuration with an opening thereof being oriented downward and the shaft 170 passes through opposed vertical walls 206. However, in the same way as in the second embodiment, the lower end portion of the shift lever 154 may be formed as the pipe 166 in the third embodiment as well.

Figure 12:
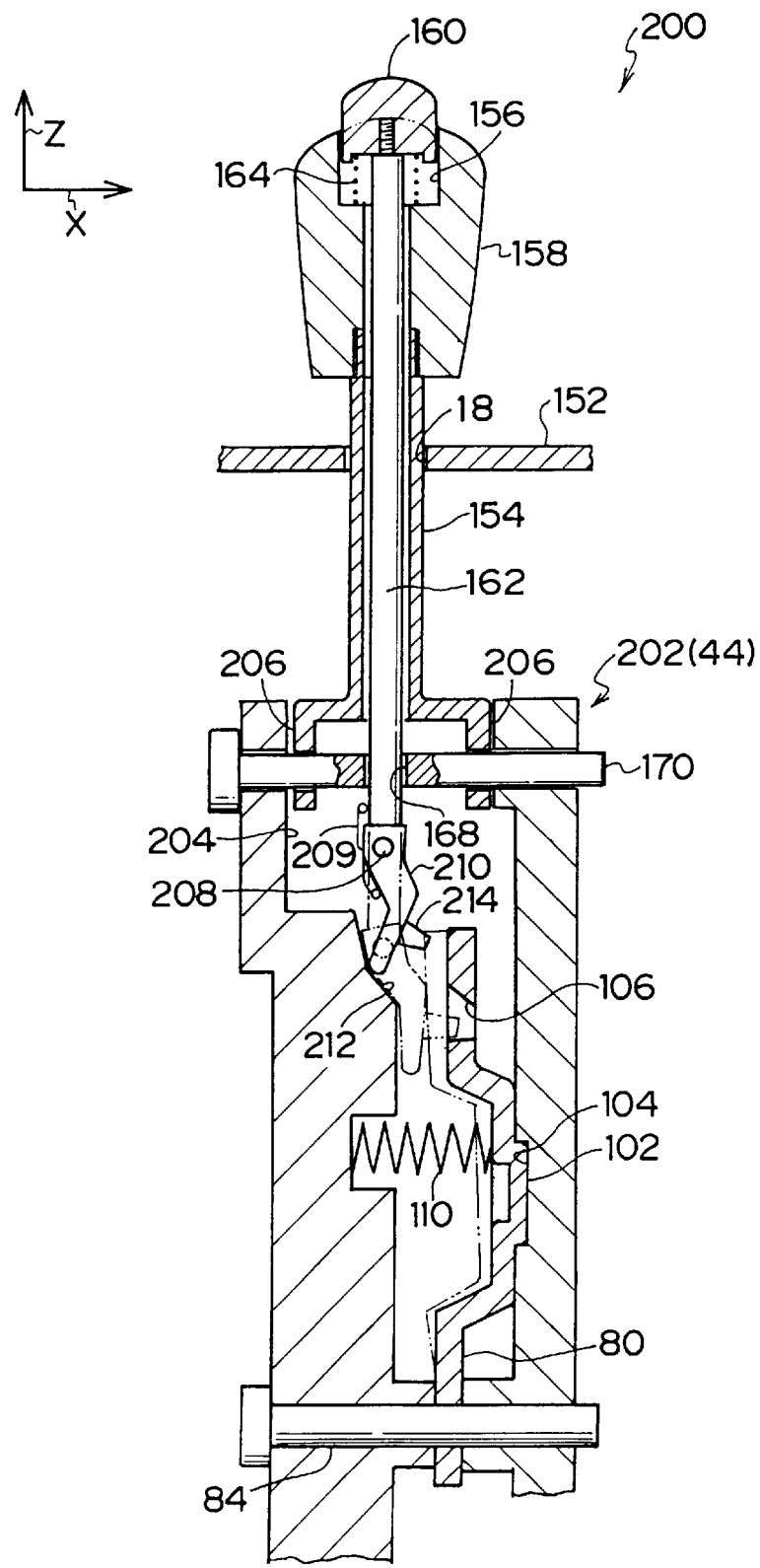
FIG. 12 is a side view of the shift lever device according to the third embodiment of the present invention.

The lower end portion of the rod 162 in the shift lever device 200 is formed as a thin-walled plate having a thickness smaller than the diametrical dimension of the rod 162 at the side of the upper end thereof. The direction perpendicular to the surface of the plate-like lower end portion of the rod 162 coincides with the longitudinal direction of the vehicle. A lever 210 serving as connecting means is provided at the lower end portion of the rod 162 and is supported by a shaft 208 passing through the rod 162 in the longitudinal direction of the vehicle in such a manner as to rotate freely around the shaft 208 at a predetermined angle. The longitudinal direction of the lever 210 coincides with the vertical direction and the longitudinal-direction intermediate portion of the lever 210 is bent in the transverse direction of the vehicle to have a substantially V-shaped configuration. A pin 214 projects from the lower end portion of the lever 210 toward the right in the transverse direction of the vehicle. Further, the lever 210 is urged by a helical coil spring 209 provided around the shaft 208 to rotate in a right-handed direction in FIG. 12 (i.e., in a counterclockwise direction) with respect to the rod 162. In the state in which the button 160 has not been pressed, the lower end portion of the lever 210 abuts against the upper end portion of an inclined surface 212 formed on the side wall of the groove 204 at the left side in the transverse direction of the vehicle due to the urging force of the helical coil spring 209.

The direction perpendicular to the inclined surface 212 is oriented upward to the right. When the button 160 is pressed to lower the rod 162, the lever 210 moves downward due to reactive force from the inclined surface 212 while rotating around the shaft 208. For this reason, as indicated by the two-dot chain line in FIG. 12, in the state in which the lever 210 has been lowered, the lower end portion of the lever 210 is displaced toward the right in the transverse direction of the vehicle as compared with the state before the lever 210 has been lowered (the state indicated by the solid line in FIG. 12).

In the same way as in the base 86 of each shift lever device 10 and 150 according to the first and second embodiments, a plurality of grooves 104 is formed in the side wall at the right side of the groove 204 in the transverse direction of the vehicle. The protrusion 102 of the control plate 80 supported by the shaft 84 passing through the base 202 can come into each groove 104.

Each of the through holes 106 formed in the control plate 80 corresponds to the pin 214 of the lever 210. In the state in which the rod 162 moves downward and the lower end portion of the lever 210 is displaced toward the right in the transverse direction of the vehicle (i.e., the state indicated by the two-dot chain line in FIG. 12), the pin 214 comes into the through hole 106. For this reason, in this state, when the shift lever 154 is pressed toward the front side of the vehicle or pulled toward the rear side of the vehicle against the urging force of the plate springs 176 and is thereby moved to the front end portion or rear end portion of the shift groove 18, in the same way as in the shift lever device 10 of the first embodiment, the control plate 80 rotates around the shaft 84 and the protrusion 102 comes into a groove 104 adjacent to the groove 104 into which the protrusion 102 has first come, thereby resulting in the shift range of the automatic transmission 94 being changed one step.

Subsequently, in this state, when the press of the button 160 is released and the rod 162 moves upward due to the urging force of the compression coil spring 164, the lower end portion of the lever 210 is displaced along the inclined surface 212 toward the left side and the pin 214 is disengaged from the through hole 106. Further, when, with the pin 214 disengaged from the through hole 106, force for pressing or pulling the shift lever 154 is released, the shift lever 154 is moved back to the intermediate portion of the shift groove 18 due to the urging force of the plate springs 176.

By repeating the above-described operation, the shift range of the automatic transmission 94 can be changed to a desired shift range.

As described above, the shift lever device 200 according to the present embodiment is also constructed in such a manner that, by swinging the shift lever 154 to the front end or rear end of the shift groove 18, the shift range of the automatic transmission 94 is changed one step, and this operation is repeated to allow change to a desired shift range. For this reason, irrespective of the number of shift ranges of the automatic transmission 94, it suffices that a stroke of the shift lever 154 swinging in the longitudinal direction of the vehicle is that for two steps of shift ranges. Accordingly, the range in which the shift lever 154 swings can be made smaller than that of a conventional shift lever and a space for installation of the shift lever device 200 at the side of the vehicle interior can thereby be decreased. For this reason, the interior space of the vehicle can be effectively utilized, for example, a space in the periphery of a driver's seat of the vehicle can be widen or can be used for installation of other device.

The location where each shift lever device 150, 200 is not limited to the position at the front side of the console box 14, and in the same way as in the first embodiment, each shift lever device 150, 200 may be provided on the instrument panel 120.

Next, a fourth embodiment of the present invention will be described.

Figure 13:
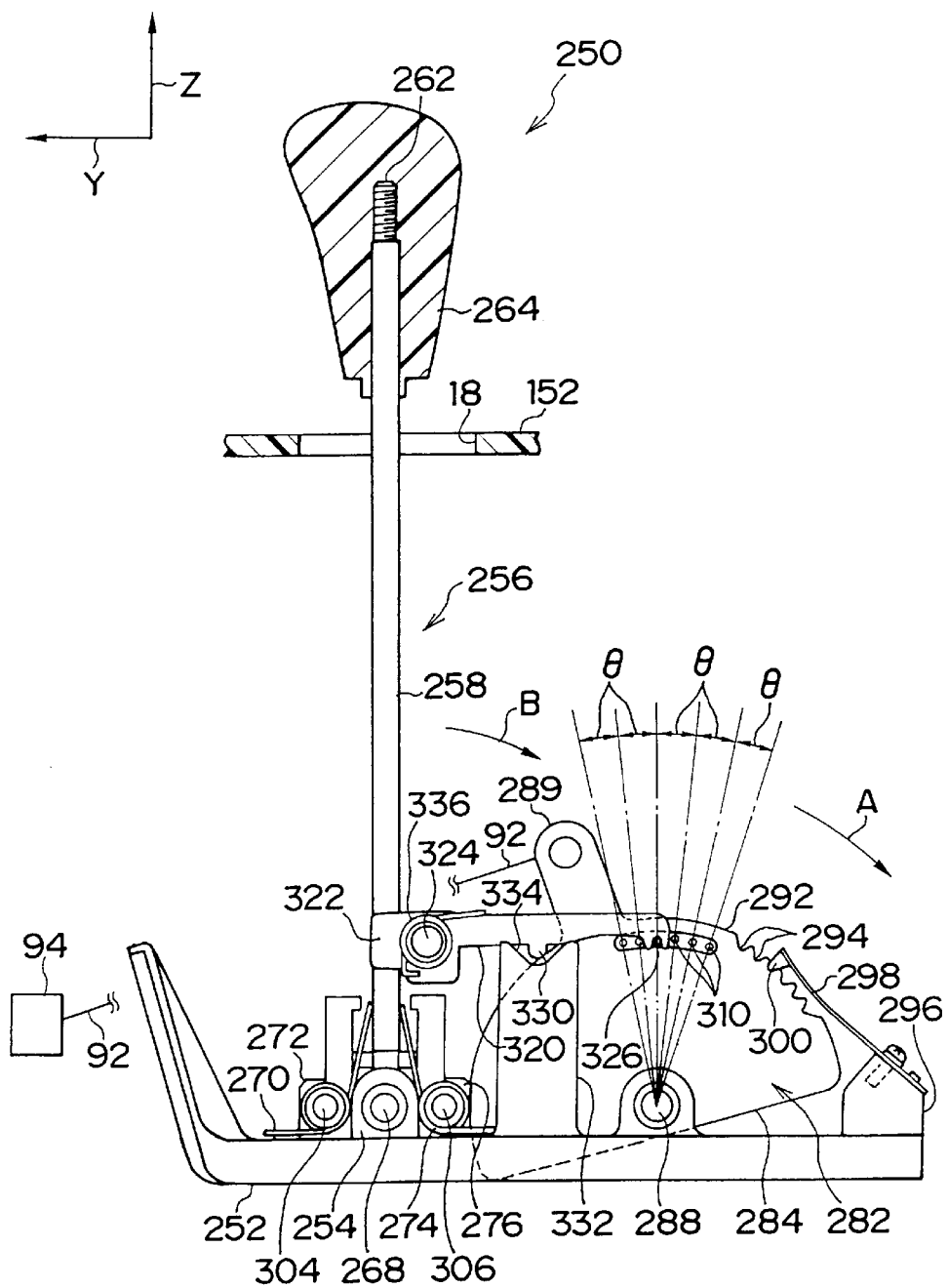
FIG. 13 is a side view of a shift lever device according to a fourth embodiment of the present invention.
Figure 14:
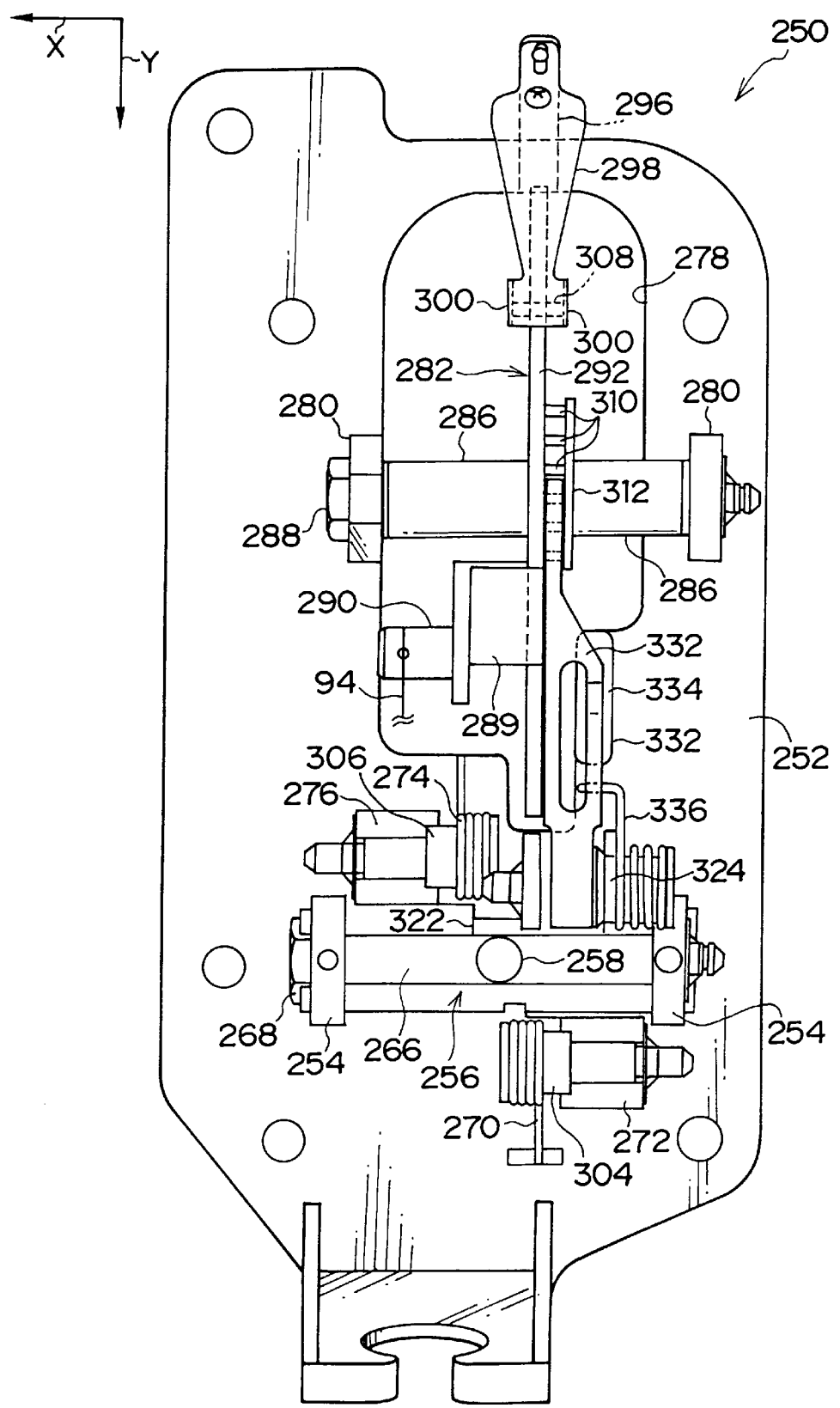
FIG. 14 is a plan view of the shift lever device according to the fourth embodiment of the present invention.

FIG. 13 shows a side view with a principal portion of a shift lever device 250 according to the fourth embodiment of the present invention being enlarged. FIG. 14 shows a plan view of the principal portion of the shift lever device 250.

As shown in these figures, the shift lever device 250 includes a base plate 252 differently from each shift lever device 10, 150, 200 of the first, second, and third embodiments. A pair of vertical walls 254 are provided upright on the base plate 252 in such a manner as to be oriented upward (i.e., the direction indicated by arrow Z in FIG. 13). These vertical walls 254 face each other in the transverse direction of the base plate 252 and a shift lever 256 is mounted between the vertical walls 254.

The shift lever 256 includes a shaft 258 whose longitudinal direction coincides with the vertical direction of the vehicle (i.e., the direction indicated by arrow Z in FIG. 13 and the direction opposite thereto). The upper end side of the shaft 258 passes through the shift groove 18 of the housing 152 and a male screw 262 is formed at the upper end portion of the shaft 258. A knob 264 made of a synthetic resin material is screwed to and fixed to the upper end of the shaft 258 by the male screw 262.

A cylindrical pipe 266 whose longitudinal direction coincides with the transverse direction of the base plate 252 is fixed to the lower end portion of the shaft 258. A shaft 268 passes through the interior of the pipe 266 and is fixed by a nut or the like in a state of passing through the vertical walls 254. As a result, the shift lever 256 is swingable around an axial line of the pipe 266.

A helical coil spring 270 is disposed at the side of the pipe 266 near an axial-direction one end of the pipe 266. A coil portion of the helical coil spring 270 is wound onto a pin 304 of a holding portion 272 formed in the base plate 252 further at the front side of the vehicle than the pipe 266 (i.e., the side of the direction indicated by arrow Y in FIGS. 13 and 14), and one end of the helical coil spring 270 is fixed to the base plate 252. Further, the other end of the helical coil spring 270 is fixed to the shaft 258 of the shift lever 256 and the helical coil spring 270 urges the shift lever 256 toward the rear side of the vehicle (i.e., the side of the direction opposite to that indicated by arrow Y in FIGS. 13 and 14).

On the other hand, a helical coil spring 274 is disposed at the side of the pipe 266 near the other axial-direction end of the pipe 266. A coil portion of the helical coil spring 274 is wound onto a pin 306 of a holding portion 276 formed in the base plate 252 further at the rear side of the vehicle than the pipe 266 (i.e., the side of the direction opposite to that indicated by arrow Y in FIGS. 13 and 14), and one end of the helical coil spring 274 is fixed to the base plate 252. Further, the other end of the helical coil spring 274 is fixed to the shaft 258 of the shift lever 256 and the helical coil spring 274 urges the shift lever 256 toward the front side of the vehicle (i.e., the side of the direction indicated by arrow Y in FIGS. 13 and 14).

Springs each having a substantially equal urging force (spring force) are used for the helical coil springs 270 and 274. When no external force other than the urging forces of the helical coil springs 270 and 274 acts on the shift lever 256, the longitudinal direction of the shift lever 256 is oriented toward the upper surface of the base plate 252 and the shift lever 256 is positioned substantially at the center in a longitudinal direction of the shift groove 18. Further, even if the shift lever 256 is operated to swing toward the front side or rear side of the vehicle against the urging force of the helical coil spring 270 or the helical coil spring 274, so long as operating force (external force) for a swinging operation is released, the shift lever 256 returns to an initial position, i.e., the substantially center in the longitudinal direction of the shift groove 18 due to the urging force of the helical coil spring 270 or the helical coil spring 274.

Further, as shown in FIG. 14, an opening portion 278 whose longitudinal direction generally coincides with the longitudinal direction of the vehicle (i.e., the direction indicated by arrow Y in FIG. 14 and the direction opposite thereto) is formed on the base plate 252. A pair of vertical walls 280 are provided upright at the longitudinal-direction intermediate portion of the opening portion 278 and in the vicinities of both transverse-direction end portions thereof. A semi-circular disk-shaped ratchet plate 282 serving as control means is disposed above the opening portion 278 and between these vertical walls 280. A pipe 286 whose longitudinal direction coincides with the transverse direction of the base plate 252 extends from the vicinity of a longitudinal-direction intermediate portion of a straight-line portion 284 in the outer peripheral portion of the ratchet plate 282. A shaft 288 passes through the interior of the pipe 286 in a state of passing through the vertical walls 280 and also being fixed to the vertical walls 280 by a nut or the like. As a result, the ratchet plate 282 is swingable around an axial line of the pipe 286.

As shown in FIG. 13, a protruding portion 289 extends from a portion of a curved portion 292 (of a circular arc) in the outer peripheral portion of the ratchet plate 282 outward in the radial direction of the curved portion 292. As shown in FIG. 14, an engaging/stopping portion 290 is formed at an end of the protruding portion 289 to extend toward the right in the transverse direction of the vehicle (in the direction indicated by arrow X in FIG. 14) and one end of a wire 92 is retained in the engaging/stopping portion 290. Namely, with the ratchet plate 282 swinging around an axial line of the pipe 286, the wire 92 is displaced along the longitudinal direction thereof so as to allow operation of the automatic transmission 94. The shift range is set by a predetermined position of the ratchet plate 282 around the pipe 286 (i.e., the inclination of the ratchet plate 282 in the longitudinal direction of the vehicle).

A plurality of moderating grooves 294 are formed in a portion of a circular arc-shaped curved portion 292 of the ratchet plate 282. A moderating plate 298 of which basal end portion is screwed on a supporting portion 296 projecting from the base plate 252 is disposed to face the moderating grooves 294. The moderating plate 298 is a so-called plate spring. A pair of vertical walls 300 facing each other in the transverse direction of the base plate 252 extend from the end portion of the moderating plate 298 toward the base plate 252. As shown in FIG. 14, a roller 308 whose axial direction coincides with the transverse direction of the base plate 252 is supported between these vertical walls 300. The outer peripheral portion of the roller 308 constantly abuts against the outer peripheral portion of the ratchet plate 282 (particularly, the curved portion 292) due to the urging force of the moderating plate 298. Further, when the roller 308 faces any one of the moderating grooves 294 due to the ratchet plate 282 swinging around the pipe 286, the roller 308 comes into and engages with the moderating groove 294 due to the urging force of the moderating plate 298. In this state, the urging force of the moderating plate 298 becomes holding force and the ratchet plate 282 is thereby held at the rotational position. The rotational position of the ratchet plate 282 at this time corresponds to a predetermined shift range among a plurality of shift ranges set in the automatic transmission 94.

As shown in FIGS. 13 and 14, a plurality of pins 310 are formed to project from the end surface of the ratchet plate 282 at the left side in the transverse direction of the vehicle (i.e., the side opposite to the direction indicated by arrow X in FIGS. 13 and 14). These pins 310 are formed substantially at concyclic positions around the pipe 286 and at intervals of a predetermined angle. A plate 312 is provided on respective end portions of the pins 310 and the respective end portions of the pins 310 are thereby connected. A hook 320 serving as connecting means is disposed at the upper side of these pins 310) in the vertical direction of the vehicle. The hook 320 is supported, in a freely rotatable manner, by a pin 324 which is formed to project from a bracket 322 fixed to a longitudinal-direction intermediate portion of the shaft 258 (more specifically, a position slightly above the pipe 266) toward the right in the transverse direction of the vehicle (i.e., the side of the direction indicated by arrow X in FIG. 14). Due to the rotation of the hook 320 around the pin 324, the hook 320 moves in close to or apart from the pins 310.

Figure 15:
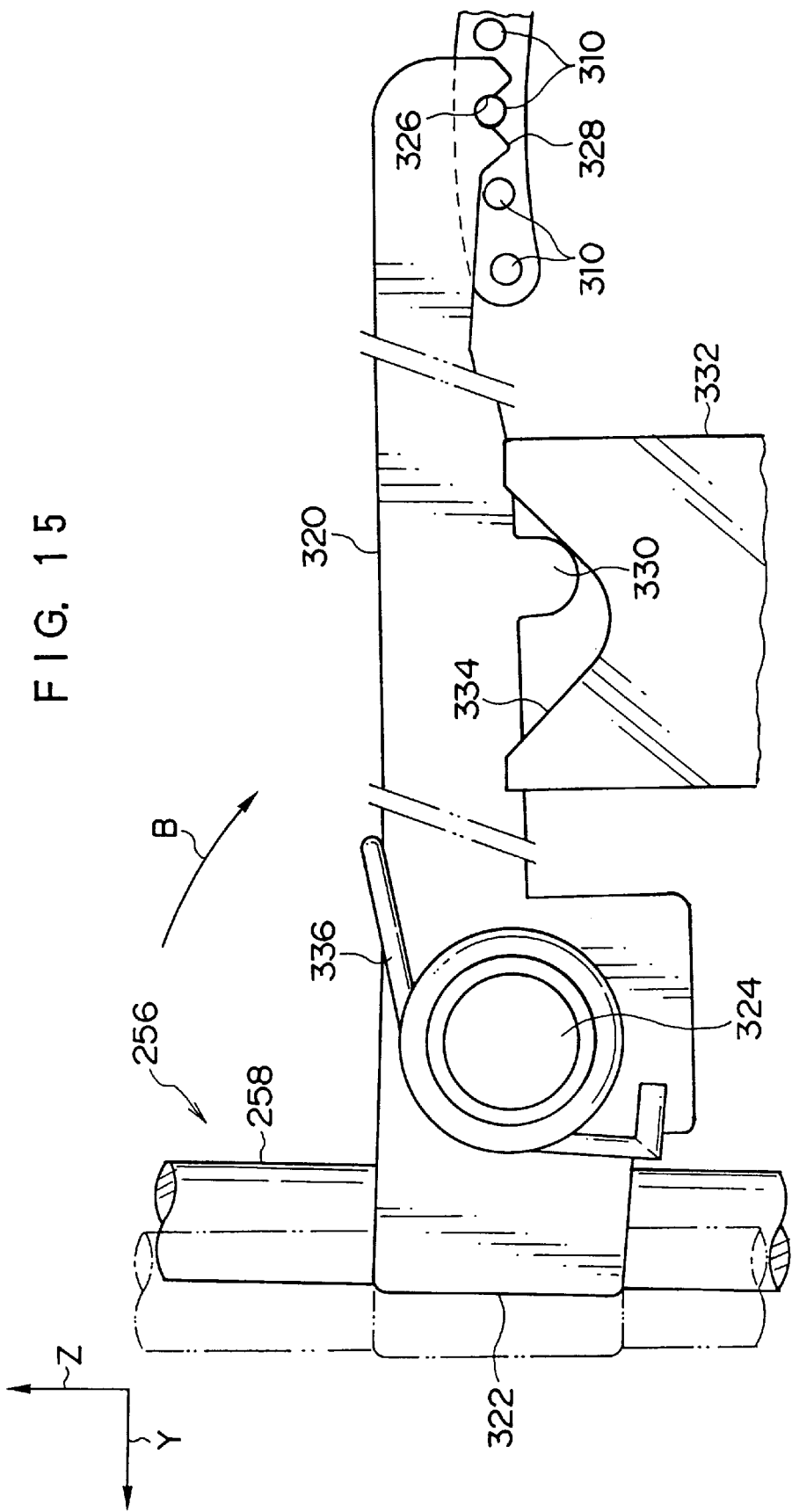
FIG. 15 is a side view with a principal portion of the shift lever device according to the fourth embodiment of the present invention being enlarged, which illustrates the state in which a hook is engaged with a pin.

An engaging groove 326 is formed at an end portion of the hook 320. In FIG. 15, there is shown a side view in which the engaging groove 326 is enlarged. As shown in this figure, the transverse dimension of the engaging groove 326 is slightly larger than the outer diameter of the pin 310 so that the pin 310 can come into the engaging groove 326. Further, an internal wall of the engaging groove 326 from the intermediate portion thereof in the direction of depth of the engaging groove 326 to an open side thereof (the side of the pin 310) is formed as a taper portion 328 which gradually increases an opening width of the groove toward the open side thereof.

Figure 16:
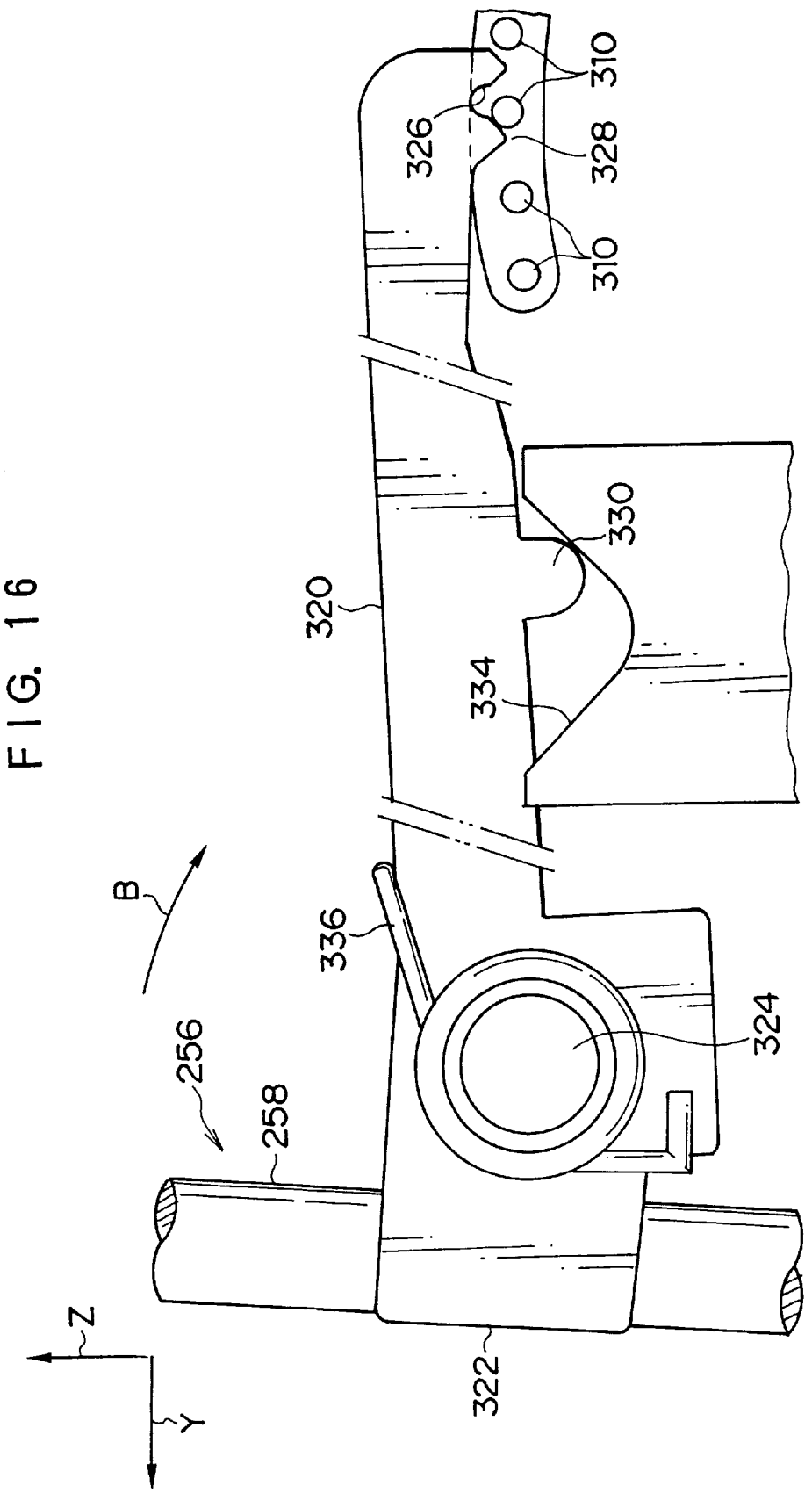
FIG. 16 is a side view corresponding to FIG. 15, which shows the state in which the hook is disengaged from the pin by operating a shift lever.

Further, as shown in FIG. 13, a protruding portion 330 is formed at a longitudinal-direction intermediate portion of the hook 320 to extend toward the lower side of the vehicle (i.e., the side of the direction opposite to that indicated by arrow Z in FIG. 13). A hook guide 332 formed to project from the base plate 252 toward the upper side of the vehicle faces the protruding portion 330. The upper end portion of the hook guide 332 is formed as a taper portion 334 which gradually increases an opening width toward the upper side. As shown in FIGS. 15 and 16, by swinging the shift lever 256 in the longitudinal direction of the vehicle, the protruding portion 300 is allowed to abut against the taper portion 334 of the hook guide 332. When the shift lever 256 is further swung in the same direction from the above state, the protruding portion 330 is guided by the taper portion 334 to slide upward. As a result, the hook 320 rotates around the pin 324 in the upward direction.

Further, as shown in FIGS. 13 and 14, a helical coil spring 336 is provided in the pin 324 of the bracket 322. One end of the helical coil spring 336 is fixed to the bracket 332 and the other end thereof is fixed to the hook 320. The hook 320 is constantly urged, around the pin 324, toward the lower side.

In the shift lever device 250 having the above-described structure, for example, when the shift lever 256 is swung around the pipe 266 toward the rear side of the vehicle (i.e., the side of the direction opposite to that indicated by arrow Y in FIGS. 13 and 14), as shown in FIG. 15, the engaging groove 326 of the hook 320 presses the pin 310 of the ratchet plate 282, which is engaged with the engaging groove 326, so as to rotate the ratchet plate 282 around the pipe 286 in the direction indicated by arrow A in FIG. 13. As a result, the wire 92 is pulled to allow operation of the automatic transmission 94. Further, at this time, the roller 308 having come into any one moderating groove 294 is guided along the inclined surface of the moderating groove 294 against the urging force (spring force) of the moderating plate 298 and is thereby about to come out from the moderating groove 294.

Subsequently, as shown in FIG. 15, when the ratchet plate 282 is rotated at an angle corresponding to an amount of one pitch of the plurality of pins 310 (i.e., an angle θ shown in FIG. 13), the automatic transmission 94 is changed via the wire 92 to another shift range, for example, changed from the N range to the D range. Further, the moderating grooves 294 are formed at the same pitch as the angle at which the pins 310 are each formed, and therefore, when the ratchet plate 282 is rotated at an angle corresponding to one pitch of the pins 310, the roller 308 comes into a moderating groove 294, which is disposed adjacently, at the side opposite to the direction in which the ratchet plate 282 rotates, to the moderating groove 294 into which the roller 308 has come, due to the urging force (spring force) of the moderating plate 298. The sense of resistance caused by the urging force of the moderating plate 298 when the roller 308 is disengaged from the moderating groove 294 and the impact caused by the urging force of the moderating plate 298 when the roller 308 comes into the moderating groove 294 are each transmitted as the sense of moderation to the hand or the like of an operator. For this reason, the shift range can be changed without an operator visually confirming the shift lever 256 and the like during the operation.

Moreover, when the shift lever 256 is swung toward the rear side of the vehicle from the above-described state, the protruding portion 330 is guided by the taper portion 334 of the hook guide 332 and slides upward, and the hook 320 rotates in the direction opposite to that indicated by arrow B in FIGS. 13 and 15 against the urging force of the helical coil spring 336 (see the state shown in FIG. 16). As a result, the pin 310 having come into the engaging groove 326 is displaced relatively toward the side of an open side of the engaging groove 326 and faces the taper portion 328 of the engaging groove 326. When the shift lever 256 is further swung toward the rear side of the vehicle from this state, the hook 320 further rotates in the direction opposite to that indicated by arrow B in FIGS. 13 and 15 due to reactive force applied from the taper portion 334 of the hook guide 332 to the protruding portion 330 and reactive force applied from the pin 324 to the taper portion 328 of the engaging groove 326. At this time, the internal wall of the engaging groove 326 by which the pin 310 has been pressed is displaced toward the side apart from the pin 310. Accordingly, even when the internal wall of the engaging groove 326 presses the pin 310 toward the rear side of the vehicle, the pressing force becomes smaller than that at the time of rotating the ratchet plate 282 by an amount of the angle corresponding to one pitch of the pin 310. In addition, at this time, the roller 308 is brought into a state of having come into a moderating groove 294 adjacent to the moderating groove 294 into which the roller 308 has come, and therefore, reduced pressing force cannot overcome to the holding force by which the roller 308 comes into the moderating groove 294 (i.e., the pressing force at this time does not allow the roller 308 to be disengaged from the moderating groove 294 against the spring force of the moderating plate 298). Accordingly, at this time, there is no possibility that the ratchet plate 282 rotate by the hook 320. The hook 320 rotates by reactive force applied from the pin 310 in the direction opposite to the direction indicated by arrow B in FIGS. 13 and 15.

Subsequently, when the pressing force applied to the shift lever 256 toward the rear side of the vehicle is released from the above-described state, the shaft 258 is pressed toward the front side of the vehicle due to the urging force of the helical coil spring 274 and the shift lever 256 rotates around the pipe 266 in the direction opposite to the direction indicated by arrow A in FIG. 13 until it is located at the position where each urging force of the helical coil spring 274 and the helical coil spring 270 is well-balanced, i.e., at the center of the shift groove 18 in the longitudinal direction thereof. At this time, the hook 320 also rotates in the direction opposite to the direction indicated by arrow A in FIG. 13 and further rotates around the pin 324 due to the urging force of the helical coil spring 336 in the direction indicated by arrow B in FIGS. 13 and 15. In the state prior to the above operation, the ratchet plate 282 rotates only by an amount of one pitch of the pin 310. At the position where the pin 310 having come into the engaging groove 326 in the state before a swinging operation of the shift lever 256 is located, a pin 310 which is disposed adjacent to the pin 310 having come into the engaging groove 326 in the state before the swinging operation of the shift lever 256 at the side opposite to the direction in which the ratchet plate 282 rotates during the swinging operation of the shift lever 256 is located.

Accordingly, due to the shift lever 256 returning to the position where each urging force of the helical coil spring 274 and the helical coil spring 270 is well-balanced, a pin 310 which subsequently comes to face the engaging groove 326, namely, a pin 310 adjacent, at the side opposite to the direction in which the ratchet plate 282 rotates during the swinging operation of the shift lever 256, to the pin 310 having come into the engaging groove 326 before the swinging operation of the shift lever 256 comes into the engaging groove 326.

Further, even if the hook 320 rotates around the pin 324 due to the urging force of the helical coil spring 336 in the direction opposite to the direction indicated by arrow B in FIGS. 13 and 15 during a period from the time when the pressing force applied to the shift lever 256 toward the rear side of the vehicle is released to the time when the shift lever 256 returns to the position where each urging force of the helical coil spring 274 and the helical coil spring 270 is well-balanced, the pin 310 having previously come into the engaging groove 326 merely abuts against the taper portion 328 at the side in which the ratchet plate 282 rotates during the swinging operation of the shift lever 256. Accordingly, the taper portion 328 is pressed substantially upward by the pin 310 and the pin 310 is relatively disengaged from the engaging groove 326. Accordingly, even in this case, the hook 320 can be reliably engaged with a newly opposed pin 310.

By repeating the above-described swinging operation of the shift lever 256 toward the rear side of the vehicle and release of the swinging operation, the shift range can be changed one step for each time. Further, when the swinging operation of the shift lever 256 toward the front of the vehicle is effected and the swinging operation is released, the ratchet plate 282 is rotated by one pitch of the pin 310 in the direction opposite to the direction indicated by arrow A in FIG. 13 in the substantially same way as in the case of the swinging operation of the shift lever 256 toward the rear side of the vehicle and release of this swinging operation. Due to repetition of the swinging operation of the shift lever 256 and the release of this swinging operation, the shift range can be changed one stage for each time. Namely, by swinging the shift lever 256 in the longitudinal direction of the vehicle a proper number of times, the change to a desired shift range can be made possible.

As described above, although the operation of the shift lever device 250 in the present embodiment is different from that of each shift lever device 10, 150, 200 according to the above-described first, second, and third embodiments, the shift lever device 250 is the same as those of the other embodiments in that the shift range can be changed one step by one swinging operation of the shift lever device and the swinging operation is repeated to allow the change to a desired shift range. Accordingly, the shift lever device 250 of the present embodiment can basically obtain the same effect as that of each shift lever device 10, 150, 200 according to the first, second, and third embodiments.

Further, in the shift lever device 250 according to the present embodiment, it suffices that the shift lever 256 be merely operated to swing. For example, it is not necessary that the shift lever 24 be moved in a select direction (i.e., the direction perpendicular to the shift-operating direction) prior to the shift operation of the shift lever 24 in the same way as in the shift lever device 10 according to the first embodiment. Moreover, it is also unnecessary that the button 160 of the knob 158 be pressed prior to the shift operation of the shift lever 154 in the same way as in each shift lever device 150, 200 according to the second and third embodiments.

Each of the above-described embodiments has a structure in which the shift range of the automatic transmission 94 is changed in such a manner that the protrusion 102 (214) is inserted into the through hole 106 of the control plate 80 at the intermediate portion of the shift groove 18, and in this state, the shift lever 24 (154) is moved toward the front end or rear end of the shift groove 18, namely, a structure in which the shift range of the automatic transmission 94 is changed during the forward movement of the shift lever 24 (154). However, the present invention is not limited to the same. For example, there may also be applied a structure in which the shift range of the automatic transmission 94 is changed in such a manner that the shift lever 24 (154) is moved toward the front end or rear end of the shift groove 18, and in this state, the protrusion 102 (214) is inserted into the through hole 106 of the control plate 80, and thereafter, the shift lever 24 (154) is moved back to the intermediate portion of the shift groove 18, namely, a structure in which the shift range of the automatic transmission 94 is changed during a backward movement of the shift lever 24 (154) after the forward movement thereof.

As described above, the shift lever device according to the present invention allows installation of the device in a small space, and therefore, it is possible to effectively utilize the space of a vehicle interior, for example, to widen a space in the periphery of a driver's seat or to use the space for installation of other devices.

What is claimed is:

1. A shift lever device which effects a gear-shift operation for an automatic transmission of a vehicle by a shift operation of a shift lever, comprising:

(a) a control mechanism adapted to be connected to an automatic transmission and movable along an axis within a predetermined range into a selected one of at least three incremental moving positions, each of said positions corresponding to a gear-shift position of the automatic transmission; and (b) a driving assembly including a shift lever movable along said axis a maximum stroke distance corresponding to two of said incremental positions, and a connecting means for connecting and disconnecting said shift lever to and from said control mechanism at the begining and the end of a shifting stroke, respectively, to move said control mechanism into any one of said gear-shift positions of said automatic transmission.

2. A shift lever device according to claim 1, wherein the shift lever can move from a neutral position either forward or backward along said axis a distance corresponding to one gear-shift position of said control mechanism.

3. A shift lever device according to claim 2, wherein said connecting means which connects the shift lever to the control mechanism connects and disconnects said shift lever and said control mechanism before and after the movement of said shift lever from said neutral position to said forward or backward position, respectively.

4. A shift lever device according to claim 3, wherein said driving assembly includes an operating means movable along the shift lever for moving the connecting means into engagement with said control mechanism.

5. A shift lever device according to claim 4, wherein said operating means is a bar-shaped body accommodated in an interior of the shift lever in such a manner as to be slidable along a longitudinal direction of the shift lever.

6. A shift lever device according to claim 1, wherein when the shift lever is moved in a predetermined direction different from the axis of movement of the shift lever, said connecting means connects, the shift lever to said control mechanism.

7. A shift lever device according to claim 6, wherein said connecting means includes a protruding portion, and said control mechanism includes a recess for receiving said protruding portion, and said connecting means connects the shift lever to said control mechanism by engaging the protruding portion into said recess of said control means.

8. A shift lever device according to claim 6, wherein said predetermined direction of movement of said shift lever is a second axis that is substantially orthogonal to said first axis.

9. A shift lever device according to claim 8, wherein said connecting means includes a ball bearing.

10. A shift lever device according to claim 1, wherein said control mechanism is pivotally movable within said predetermined range, and said control mechanism is displaced to one of said gear-shift positions of the transmission due to said pivotal movement.

11. A shift lever device according to claim 1, wherein movement of said control mechanism is controlled by a shift-lock control device which engages with and locks said control mechanism into a selected gear-shift position and which releases said locking in response to movement of a brake pedal of a vehicle.

12. A shift lever device according to claim 1, wherein said driving assembly includes a driving mechanism which moves said control mechanism by one shift position in response to a movement in one direction of the shift lever along said axis and which does not move said control mechanism when said shift lever is moved in an opposite direction.

13. A shift lever device according to claim 1, wherein said driving assembly connects the shift lever and said control mechanism at a beginning of movement in one direction along said axis, and releases the connection of the shift lever and said control mechanism at a beginning of movement in an opposite direction.

14. A shift lever device according to claim 13, wherein a cam is provided which engages and releases the shift lever and said control mechanism.

15. A shift lever device which effects a gear-shift operation for an automatic transmission of a vehicle by a shift operation of a shift lever, comprising (a) a control mechanism adapted to be connected to an automatic transmission and movable along an axis within a predetermined range into a selected one of, a plurality of incremental moving positions, each of said positions corresponding to a gear-shift position of the automatic transmission; and (b) a driving assembly including a shift lever movable along said axis a maximum stroke distance corresponding to two of said incremental moving positions, and a connecting means for connecting said shift lever to said control mechanism when said lever is moved in a direction different from said axial position, and disconnecting said shift lever from said control mechanism at the beginning and the end of a shifting stroke, respectively, to move said control mechanism into any one of said gear-shift positions of said automatic transmission.

16. A shift lever device according to claim 15, wherein said driving assembly includes a driving mechanism which connects the shift lever to said control means when the shift lever is moved in a direction different from the axial direction.

17. A shift lever device according to claim 15, wherein said driving assembly includes operating means which is provided in the shift lever and which is movable along an axis of the shift lever for connecting said shift lever to said control mechanism.

18. A shift lever device comprising:

a shift lever movable at least between a neutral position and a first position;

a control mechanism adapted to be connected to an automatic transmission and having a plurality of engaging portions, each of the engaging portions corresponding to a respective one of predetermined gear-shift positions of the automatic transmission; and a driving mechanism operated in accordance with movement of the shift lever and having an engaging portion which is engagable with the engaging portions of the control mechanism, wherein, due to movement of the shift lever between the neutral position and the first position, the engaging portion of the driving mechanism engages with one of the engaging portions of the control mechanism, and the control mechanism is displaced and shifts the gear shift positions by one shift position, and by repeating an operation of moving the shift lever, the gear shift positions can be shifted one-by-one.

19. A shift lever device according to claim 18, wherein the shift lever is movable between the neutral position, the first position and a second position, and due to movement of the shift lever between the neutral position and the first position, the control mechanism is displaced in a first direction and shifts the gear shift positions by one shift position, and due to movement of the shift lever between the neutral position and the second position, the control mechanism is displaced in a second direction and shifts and gear shift positions by one shift position.

20. A shift lever device according to claim 19, wherein the driving mechanism is operated by pushing a button provided in a knob of said shift lever so as to engage the engaging portion of the driving mechanism with one of the engaging portions of the control mechanism.

21. A shift lever device according to claim 18, wherein the driving mechanism is operated by pushing a button provided in a knob of said shift lever so as to engage the engaging portion of the driving mechanism with one of the engaging portions of the control mechanism.

* * * * *